US009256363B2

(12) United States Patent
Sudo et al.

(10) Patent No.: US 9,256,363 B2
(45) Date of Patent: Feb. 9, 2016

(54) INFORMATION PROCESSING DEVICE AND CHARACTER INPUT METHOD

(75) Inventors: Tomohiro Sudo, Yokohama (JP); Hiroshi Tsuruta, Yokohama (JP); Atsuo Chiba, Yokohama (JP); Nayu Nomachi, Yokohama (JP); Takayuki Sato, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 170 days.

(21) Appl. No.: 13/638,159

(22) PCT Filed: Mar. 29, 2011

(86) PCT No.: PCT/JP2011/057823
§ 371 (c)(1),
(2), (4) Date: Sep. 28, 2012

(87) PCT Pub. No.: WO2011/122627
PCT Pub. Date: Oct. 6, 2011

(65) Prior Publication Data
US 2013/0021259 A1    Jan. 24, 2013

(30) Foreign Application Priority Data

Mar. 29, 2010  (JP) ................................ 2010-076293
Apr. 23, 2010  (JP) ................................ 2010-099864

(51) Int. Cl.
G06F 3/041      (2006.01)
G06F 3/0488     (2013.01)
(Continued)

(52) U.S. Cl.
CPC .......... *G06F 3/04883* (2013.01); *G06F 3/0483* (2013.01); *G06F 3/04845* (2013.01)

(58) Field of Classification Search
CPC .... G06K 9/222; G06F 3/04883; G06F 3/0488
USPC ......................................................... 345/169
See application file for complete search history.

(56) References Cited

U.S. PATENT DOCUMENTS 7,098,896 B2 *   8/2006  Kushler et al. ................. 345/168
8,667,423 B2 *   3/2014  Damale ................. G06F 3/0485
                                                      715/763

(Continued)

FOREIGN PATENT DOCUMENTS

JP          8292944 A      11/1996
JP         11053116 A       2/1999

(Continued)

OTHER PUBLICATIONS

Office Action mailed Apr. 1, 2014, corresponds to Japanese patent application No. 2010-076293, for which an explanation of relevance is attached.

(Continued)

*Primary Examiner* — Temesgh Ghebretinsae
*Assistant Examiner* — Michael J Jansen, II
(74) *Attorney, Agent, or Firm* — Hauptman Ham, LLP

(57) ABSTRACT

According to an aspect, an information processing device includes: a touch panel for detecting a contact; and a controller configured to display a virtual keyboard including a plurality of buttons on the touch panel, and receive, when the touch panel detects a contact started at a first position on the surface of the touch panel and terminated at a second position on the surface of the touch panel, a character string including characters corresponding to the buttons displayed on a trajectory obtained by connecting each position at which the contact is detected from when the contact is started at the first position to when the contact is terminated at the second position as input.

8 Claims, 17 Drawing Sheets

(51) Int. Cl.
*G06F 3/0484* (2013.01)
*G06F 3/0483* (2013.01)

(56) References Cited

U.S. PATENT DOCUMENTS

| | | | |
|---|---|---|---|
| 8,892,170 B2* | 11/2014 | Teng | H04M 1/67 455/411 |
| 8,976,134 B2* | 3/2015 | Sudo | G06F 3/04886 345/156 |
| 2004/0140956 A1* | 7/2004 | Kushler et al. | 345/168 |
| 2005/0146508 A1 | 7/2005 | Kirkland et al. | |
| 2008/0040692 A1* | 2/2008 | Sunday | G06F 3/04883 715/863 |
| 2009/0094562 A1* | 4/2009 | Jeong | G06F 3/0486 715/863 |
| 2009/0195518 A1* | 8/2009 | Mattice | G06F 3/0416 345/177 |
| 2009/0237361 A1* | 9/2009 | Mosby | G06F 3/04883 345/173 |
| 2009/0313299 A1* | 12/2009 | Bonev | G06Q 10/109 |
| 2010/0095205 A1 | 4/2010 | Kinoshita | |
| 2011/0035691 A1* | 2/2011 | Kim | 715/765 |
| 2011/0035708 A1* | 2/2011 | Damale | G06F 3/0485 715/863 |
| 2011/0163967 A1* | 7/2011 | Chaudhri | 345/173 |
| 2012/0001922 A1* | 1/2012 | Escher et al. | 345/467 |
| 2012/0180001 A1* | 7/2012 | Griffin | G06F 3/04883 715/863 |
| 2013/0050125 A1* | 2/2013 | Sudo | G06F 3/04886 345/173 |
| 2013/0102366 A1* | 4/2013 | Teng | H04M 1/67 455/566 |

FOREIGN PATENT DOCUMENTS

| | | |
|---|---|---|
| JP | 2003141448 A | 5/2003 |
| JP | 2005196759 A | 7/2005 |
| JP | 2007328795 A | 12/2007 |
| JP | 2008108233 A | 5/2008 |

OTHER PUBLICATIONS

International Search Report and Written Opinion corresponding to PCT/JP2011/057823, dated Jun. 28, 2011.

* cited by examiner

FIG.8

| CHARACTER | Q | W | E | ... |
|---|---|---|---|---|
| x | 10 | 32 | 54 | ... |
| y | 10 | 10 | 10 | ... |
| WIDTH | 20 | 20 | 20 | ... |
| HEIGHT | 40 | 40 | 40 | ... |

9D

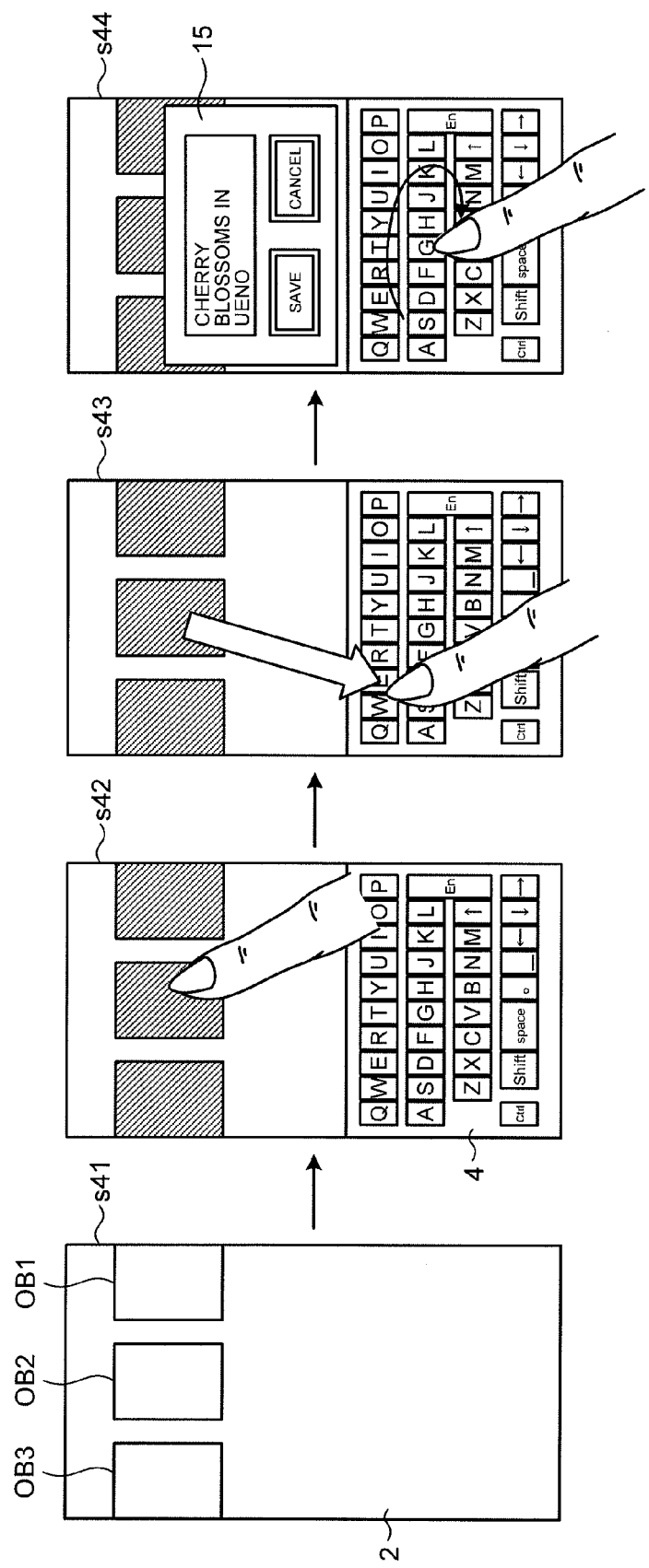

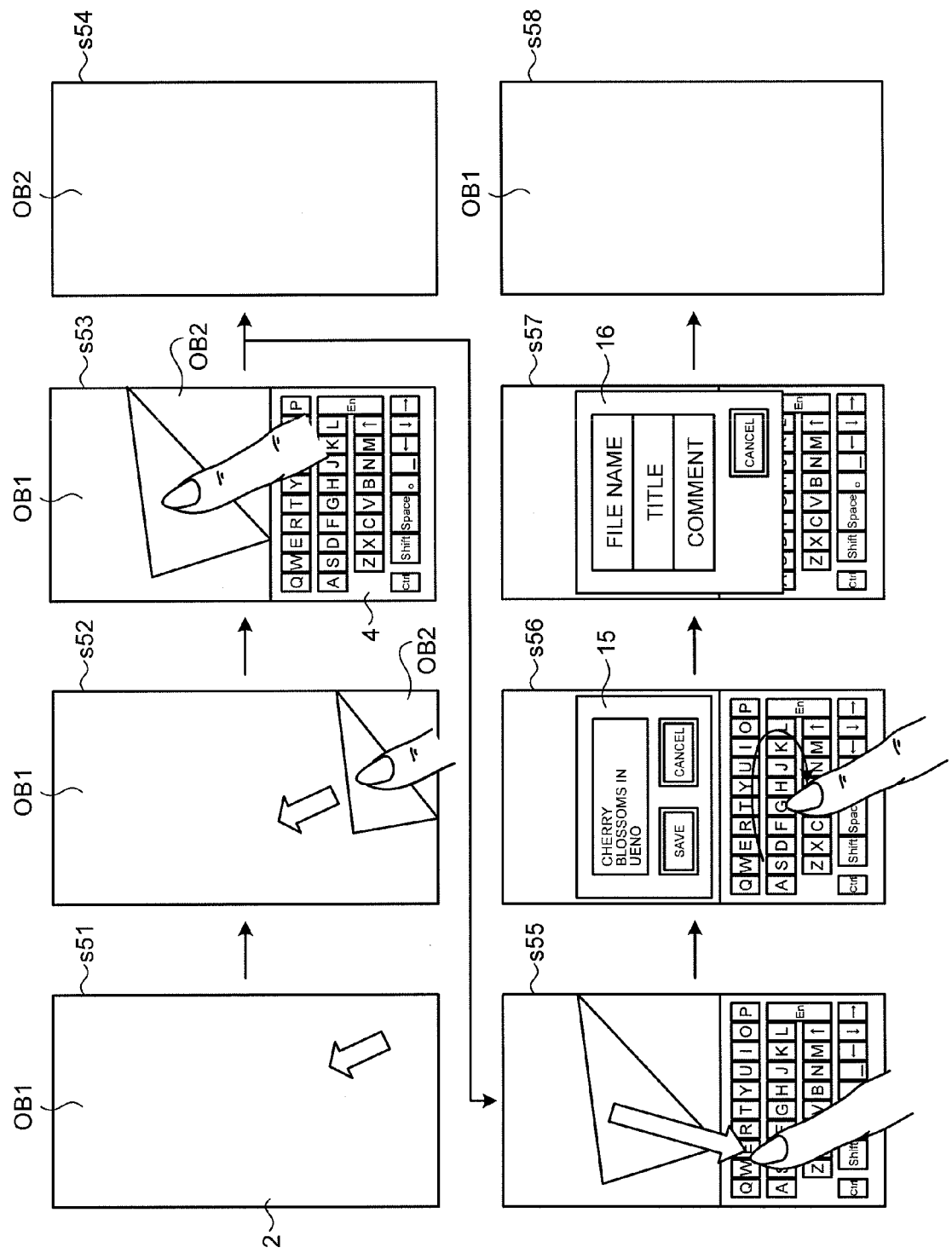

INFORMATION PROCESSING DEVICE AND CHARACTER INPUT METHOD

CROSS-REFERENCE TO RELATED APPLICATION

This application is a National Stage of PCT international application Ser. No. PCT/JP2011/057823 filed on Mar. 29, 2011 which designates the United States, and which is based upon and claims the benefit of priority from Japanese Patent Application No. 2010-076293, filed on Mar. 29, 2010, and Japanese Patent Application No. 2010-099864, filed on Apr. 23, 2010.

FIELD

The present disclosure relates to an information processing device and a character input method.

BACKGROUND

In recent years, touch panels have been widely used so as to realize small-sized information processing devices enabling intuitive operations and including no device that requires a physically large area, such as a keyboard. As technologies for inputting characters by using such a touch panel, a technology for inputting characters in handwriting on a touch panel (e.g., Patent Literature 1) and a technology for inputting characters by using a virtual keyboard displayed on a touch panel (hereinafter, referred to as a "virtual keyboard") (e.g., Patent Literature 2) are known.

CITATION LIST

Patent Literature

Patent literature 1: Japanese Patent Application Laid-open No. 2003-141448
Patent Literature 2: Japanese Patent Application Laid-open No. 2008-108233

Technical Problem

However, the conventional technology for inputting characters in handwriting on a touch panel has a problem in that inputting characters at high speed is difficult to achieve because it takes time to input and recognize characters. On the other hand, the conventional technology for inputting characters by using a virtual keyboard has a problem in that inputting characters at high speed is difficult to achieve because a user needs to repeat a gesture of moving his or her finger up and down with respect to a touch panel for each key corresponding to a character desired to be input.

For the foregoing reasons, there is a need for an information processing device and a character input method that enable inputting characters on a touch panel at high speed.

SUMMARY

According to an aspect, an information processing device includes: a touch panel for detecting a contact; and a controller configured to display a virtual keyboard including a plurality of buttons on the touch panel, and receive, when the touch panel detects a contact started at a first position on the surface of the touch panel and terminated at a second position on the surface of the touch panel, a character string including characters corresponding to the buttons displayed on a trajectory obtained by connecting each position at which the contact is detected from when the contact is started at the first position to when the contact is terminated at the second position as input.

According to another aspect, the controller is configured to receive the character string including a character corresponding to a button displayed at a position where a predetermined gesture is performed among the characters corresponding to the buttons displayed on the trajectory as input.

According to another aspect, the controller is configured to receive the character string including a character corresponding to a button displayed at the first position among the characters corresponding to the buttons displayed on the trajectory as input.

According to another aspect, the controller is configured to receive the character string including a character corresponding to a button displayed at the second position among the characters corresponding to the buttons displayed on the trajectory as input.

According to another aspect, the controller is configured to receive the character string including a character corresponding to a button displayed at a position where change in a movement direction is performed among the characters corresponding to the buttons displayed on the trajectory as input.

According to another aspect, the controller is configured to receive the character string including a character corresponding to a button displayed at a position where movement to draw a trajectory in a predetermined shape is performed among the characters corresponding to the buttons displayed on the trajectory as input.

According to another aspect, when the character string obtained by combining the characters corresponding to the buttons displayed at the positions where the predetermined gestures are performed is not a proper character string, the controller is configured to receive the character string supplied with a character corresponding to a button displayed at a position other than the positions where the predetermined gestures are performed among the characters corresponding to the buttons displayed on the trajectory as input.

According to another aspect, the controller is configured to perform matching between the character string obtained by combining the characters corresponding to the buttons displayed at the positions where the predetermined gestures are performed and a dictionary, and receive, when a character string that matches the combined character string is retrieved, the character string thus retrieved as input.

According to another aspect, the controller is configured to receive input of attribute information through the virtual keyboard when the touch panel detects a contact started in a display area of an object displayed on the touch panel and maintained to a display area of the virtual keyboard, and store the attribute information thus received in a manner associated with the object displayed at a position where the contact is started.

According to another aspect, the controller is configured to display the virtual keyboard on the touch panel when start of the contact in the display area of the object is detected by the touch panel.

According to another aspect, when a predetermined gesture is performed subsequently to start of the contact in the display area of the object, the controller is configured to change an object to be displayed on the touch panel in accordance with a predetermined display order.

According to another aspect, when the contact is detected while a plurality of objects displayed on the touch panel are in a selected state, the controller is configured to store the attribute information received through the virtual keyboard in a manner associated with the objects.

According to an aspect, a character input method is performed by an information processing device including a touch panel that detects a contact. The character input method includes: displaying a plurality of buttons on the touch panel; detecting, by the touch panel, a contact started at a first position on the surface of the touch panel and terminated at a second position on the surface of the touch panel; and receiving a character string including characters corresponding to the buttons displayed on a trajectory obtained by connecting each position at which the contact is detected by the touch panel from when the contact is started at the first position to when the contact is terminated at the second position as input. According to another aspect, the character input method further includes: displaying an object on the touch panel; and storing the character string received as input as attribute information of the object when the contact is started at the first position in a display area of the object.

Advantageous Effects of Invention

The information processing device and the character input method according to the present invention enable inputting characters on a touch panel at high speed.

BRIEF DESCRIPTION OF DRAWINGS

FIG. 8 is a diagram illustrating an example of virtual keyboard data.

FIG. 19 is a diagram illustrating another example of the operation performed by the mobile phone that is displaying the object browsing screen.
FIG. 20 is a diagram illustrating still another example of the operation performed by the mobile phone that is displaying the object browsing screen.

DESCRIPTION OF EMBODIMENTS

Exemplary embodiments according to the present invention are described below in greater detail with reference to the accompanying drawings. Note that the description below is not intended to limit the present invention. Components in the description below include components that can be easily conceived by those skilled in the art and components that are substantially identical, that is, components within a so-called equivalent scope. In the description below, a mobile phone is explained as an example of an information processing device. However, a target to which the present invention is applied is not limited to the mobile phones. The present invention can also be applied to various types of devices including a touch panel, such as personal handyphone systems (PHSs), personal digital assistants (PDAs), portable navigation devices, personal computers, and gaming devices, etc.

First Embodiment

Figure 1:
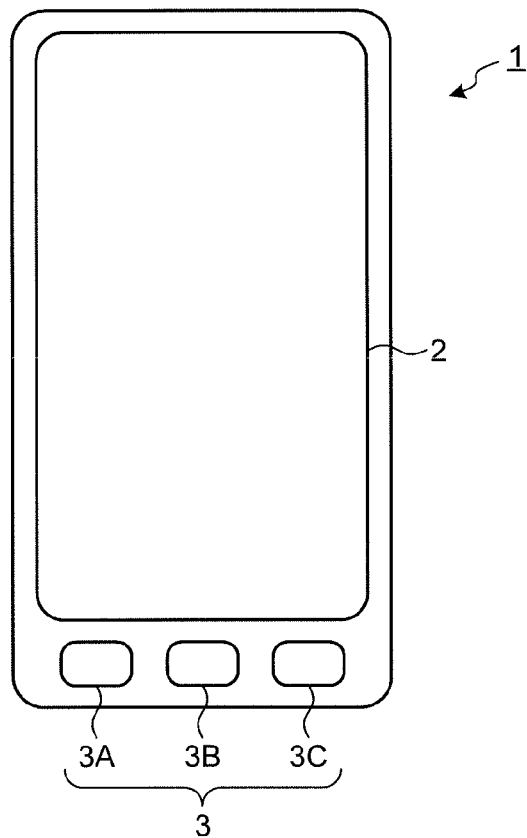
FIG. 1 is a front view of an appearance of a mobile phone according to a first embodiment.

FIG. 1 is a front view of an appearance of a mobile phone 1 serving as an embodiment of the information processing device according to the present invention. The mobile phone 1 includes a touch panel 2 and an input unit 3 composed of a button 3A, a button 3B, and a button 3C. The touch panel 2 displays a character, a figure, an image, and the like, and detects various types of gestures made on the touch panel 2 using a finger, a stylus, a pen, and the like (hereinafter, simply referred to as a "finger"). When any one of the buttons is pressed, the input unit 3 activates a function corresponding to the button thus pressed.

Figure 2:
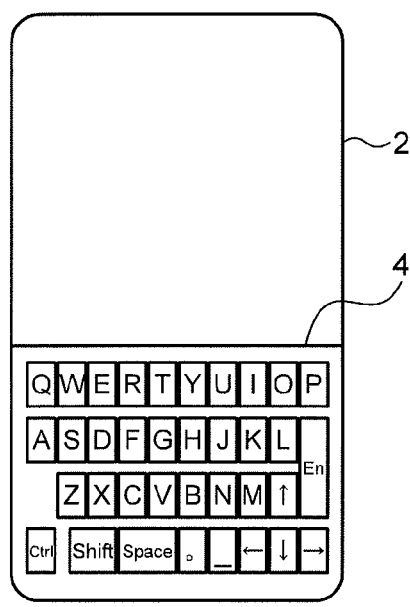
FIG. 2 is a diagram illustrating a virtual keyboard displayed on a touch panel.

To receive input of a character from a user, the mobile phone 1 displays a virtual keyboard 4 on the touch panel 2 as illustrated in FIG. 2. The virtual keyboard 4 includes a plurality of virtual buttons resembling keys of a physical keyboard. If the user makes a gesture of placing the finger on (bringing the finger into contact with) a button "Q" in the virtual keyboard 4 and pulling the finger away therefrom, for example, the touch panel 2 detects the gesture, whereby the mobile phone 1 receives a character "Q" as input.

The mobile phone 1 further receives input of characters by a consecutive method on the virtual keyboard 4. The consecutive method used herein means a method for allowing the user to input a plurality of characters consecutively by moving the finger on the virtual keyboard 4 with the finger keeping the touch with the touch panel 2. In the consecutive method, for example, the user moves the finger in a sliding manner in order of a button "W", a button "E", and a button "T" with the finger keeping the touch with the touch panel 2, thereby inputting a character string "WET".

As described above, in the consecutive method, only by moving the finger on the touch panel 2 in the sliding manner, the user can input a plurality of characters without making a gesture of moving the finger up and down for each button. Accordingly, the user can input the characters at extremely high speed.

In the consecutive method, however, for each button arranged on the trajectory along which the user moves the finger, it is required to determine whether the user intentionally touches the button to input a character corresponding thereto, or whether the user moves the finger across the button only to move the finger to another button. For example, an assumption is made that the virtual keyboard 4 has the QWERTY arrangement, and that the user desires to input the word "WET" described above. In this case, when moving from the button "E" to the button "T", the finger of the user passes across a button "R" arranged therebetween. As a result, if it fails to be determined that the user touches the button "R" not intentionally, a character string "WERT" is received as input despite the intention of the user.

To address this, the mobile phone 1 determines a button displayed at a position where the touch panel 2 detects a predetermined gesture to be a button intentionally touched by the user to input a character among buttons arranged on the trajectory along which the user moves the finger. Specifically, if the touch panel 2 detects a gesture of starting contact of the finger, and a button is present at the position where the start of the contact is detected, the mobile phone 1 determines that the button is intentionally touched. Furthermore, if the touch panel 2 detects a gesture of finishing the movement of the finger and pulling the finger away from the touch panel 2, and a button is present at the position where the termination of the contact is detected, the mobile phone 1 determines that the button is intentionally touched.

Furthermore, in the case where the touch panel 2 detects a gesture of changing the direction of movement of the finger with the finger keeping the touch with the touch panel 2, if a button is present at the position where the change of the direction of movement is detected, the mobile phone 1 determines the button to be intentionally touched. Specifically, the mobile phone 1 compares the direction of movement when the finger enters the button and the direction of movement when the finger leaves the button. If the angular difference between the directions of the movements is larger than a threshold value, the mobile phone 1 determines the button to be intentionally touched by the user.

Figure 3:
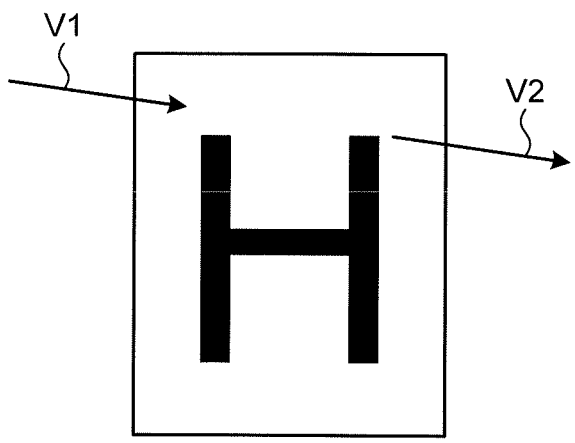
FIG. 3 is a diagram illustrating an example in which a finger passes across a button area.
Figure 4:
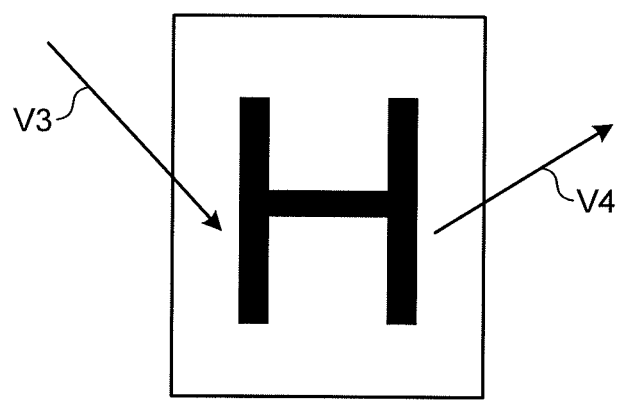
FIG. 4 is a diagram illustrating an example in which a direction of movement of the finger is changed in the button area.

This is because, while the finger is moving to another button, and only passing across a button, the finger moves on the button in one direction, and the angular difference between V1 indicating the direction of movement (vector) when entering the button and V2 indicating the direction of movement when leaving the button is assumed to be small as illustrated in FIG. 3. Furthermore, this is because, if the angular difference between V3 indicating the direction of movement when entering the button and V4 indicating the direction of movement when leaving the button is large as illustrated in FIG. 4, it is highly possible that the user intentionally touches the button, and changes the direction of movement to touch another button. In other words, it can be determined that the button is one of target buttons.

Figure 5:
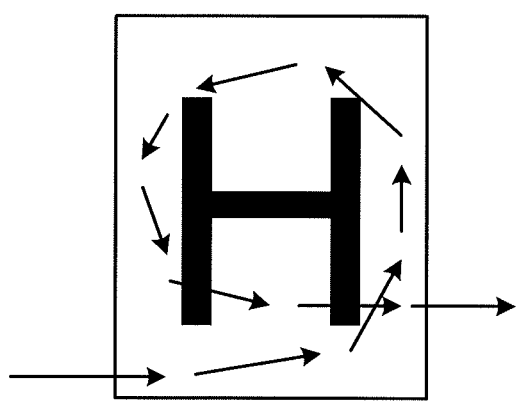
FIG. 5 is a diagram illustrating an example in which the finger draws a rotational trajectory in the button area.

Furthermore, if the touch panel 2 detects a gesture of moving the finger drawing a rotational trajectory in a button area with the finger keeping the touch with the touch panel 2 as illustrated in FIG. 5, the mobile phone 1 determines that the user intentionally touches the button. This is because, if the finger only passes across the button, the finger is not assumed to move drawing such a trajectory. The trajectory is not limited to the rotational trajectory. Alternatively, the mobile phone 1 may determine that the user intentionally touches the button if the finger draws a trajectory of a characteristic shape, such as a mountain shape and a wave shape, in the button area.

As described above, if movement of the finger drawing a trajectory of a characteristic shape in a button area is detected, it is determined that the button is intentionally touched. This allows the user to input the same character consecutively in a simple manner. If the user desires to input a character "W" three times consecutively, for example, the user needs only to move the finger such that the finger draws a circle three times in a button area of "W". At this time, for example, every time the total angle of the movement vector of the finger in the button area exceeds 360 degrees, one rotation is counted. Thus, the number of rotations can be counted.

Figure 6:
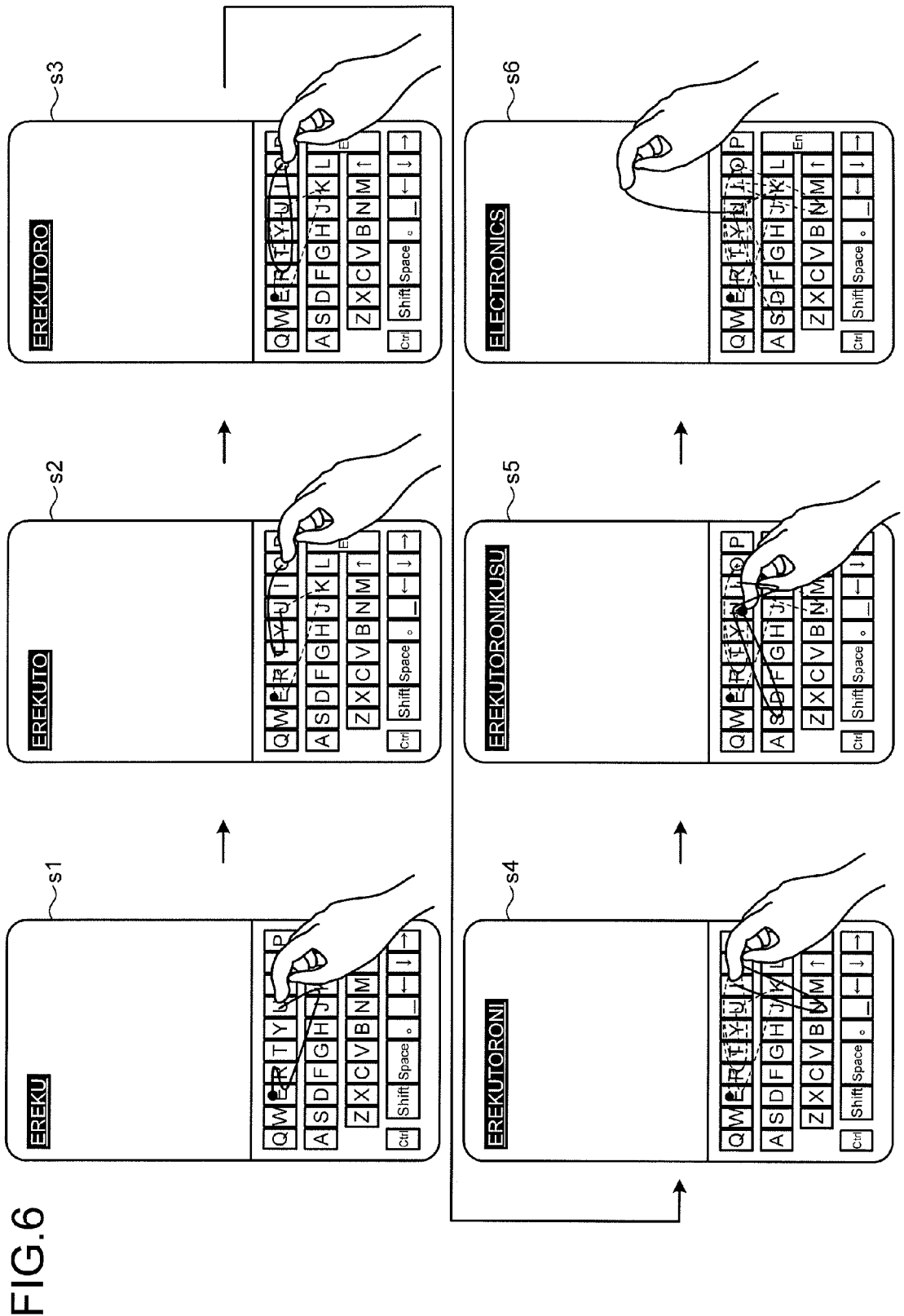
FIG. 6 is a diagram illustrating an exemplary operation of character input.

An example of an operation is illustrated in FIG. 6 in which the user inputs "electronics (EREKUTORONIKUSU)" to the mobile phone 1. At s1, after the finger is positioned in a button area of "E", the finger passes across buttons in order of "R", "E", "H", "J", and "K" while keeping the touch with the touch panel 2. In this case, the mobile phone 1 determines the button "E" on which the finger is positioned, and the buttons "R", "E", and "K" in which the angular difference between the direction of entering and the direction of leaving is larger than the threshold value to be intentionally touched.

At s2, the finger passes across buttons in order of "U", "Y", "T", "Y", "U", and "I" while keeping the touch with the touch panel 2. In this case, the mobile phone 1 determines the buttons "U" and "T" in which the angular difference between the direction of entering and the direction of leaving is larger than the threshold value to be intentionally touched. At s3, the finger passes across buttons in order of "O", "I", "U", "Y", "T", "R", "T", "Y", "U", and "I" while keeping the touch with the touch panel 2. In this case, the mobile phone 1 determines the buttons "O" and "R" in which the angular difference between the direction of entering and the direction of leaving is larger than the threshold value to be intentionally touched.

At s4, the finger passes across buttons in order of "O", "K", "N", and "J" while keeping the touch with the touch panel 2. In this case, the mobile phone 1 determines the buttons "O" and "N" in which the angular difference between the direction of entering and the direction of leaving is larger than the threshold value to be intentionally touched. At s5, the finger passes across buttons in order of "I", "K", "U", "G", "F", "D", "S", "R", "T", and "Y" while keeping the touch with the touch panel 2. In this case, the mobile phone 1 determines the buttons "I", "K", "U", and "S" in which the angular difference between the direction of entering and the direction of leaving is larger than the threshold value to be intentionally touched.

At s6, the finger that has moved to the button "U" while keeping the touch with the touch panel 2 moves away from the touch panel 2 in the button area of "U". In this case, the mobile phone 1 determines the button "U" arranged at the position where the finger moves away from the touch panel 2 to be intentionally touched.

With the operations described above, the mobile phone 1 determines that the buttons are intentionally touched in order of "E", "R", "E", "K", "U", "T", "O", "R", "O", "N", "I", "K", "U", "S", and "U". The mobile phone 1 then receives "electronics (EREKUTORONIKUSU)" obtained by combining the characters corresponding to these buttons in chronological order and converting the characters into katakana as an input character string. The character string is identical to the character string that the user intended to input.

As illustrated in the example of FIG. 6, for each button arranged on the trajectory along which the finger of the user moves while keeping the touch with the touch panel 2, the mobile phone 1 accurately determines whether the finger intentionally touches it, or only passes across it based on the gesture naturally made by the user, thereby receiving input of the characters. Accordingly, the user can input the characters accurately to the mobile phone 1 at high speed.

The mobile phone 1 does not disregard the characters corresponding to the buttons determined to be buttons across which the finger only passes, but uses the characters to improve the input accuracy. Specifically, the mobile phone 1 refers to a dictionary for the character string obtained by combining the characters corresponding to the buttons determined to be intentionally touched by the user in chronological order. If a word corresponding thereto fails to be found, the mobile phone 1 supplies the character string with the characters corresponding to the buttons determined to be buttons across which the finger only passes, and refers to the dictionary again for the character string thus supplied with the characters to find a proper word.

If the user desires to input the word "WET" to the mobile phone 1, the user puts the finger in the button area of "W", moves the finger in the direction toward the button "T" with the finger keeping the touch with the touch panel 2, and pulls the finger away from the touch panel 2 in the button area of "T". In this case, the button "W" on which the finger is positioned and the button "T" from which the finger is pulled away are determined to be intentionally touched. By contrast, the buttons "E" and "R" arranged on the trajectory along which the finger moves are determined to be buttons across which the finger only passes because the angular difference between the direction of entering and the direction of leaving is small.

However, "WT" that is a character string obtained by combining the characters corresponding to the buttons determined to be intentionally touched by the user in chronological order is not present in the dictionary. Therefore, the mobile phone 1 supplies the character string with the characters corresponding to the buttons determined to be buttons across which the finger only passes in chronological order, creates candidates of "WET", "WRT", and "WERT", and refers to the dictionary for each candidate. In this case, because the word "WET" is included in the dictionary, the mobile phone 1 receives "WET" as the input characters. The character string is identical to the character string intended to be input by the user.

If the word "WET" is to be input, the user may draw a rotational trajectory on the button "E" while moving the finger from the button "W" toward the button "T" with the finger keeping the touch with the touch panel 2. Performing such an operation allows the user to indicate explicitly to the mobile phone 1 that the user intentionally touches the button "E", thereby making it possible to improve the identification accuracy of the input character string.

Figure 7:
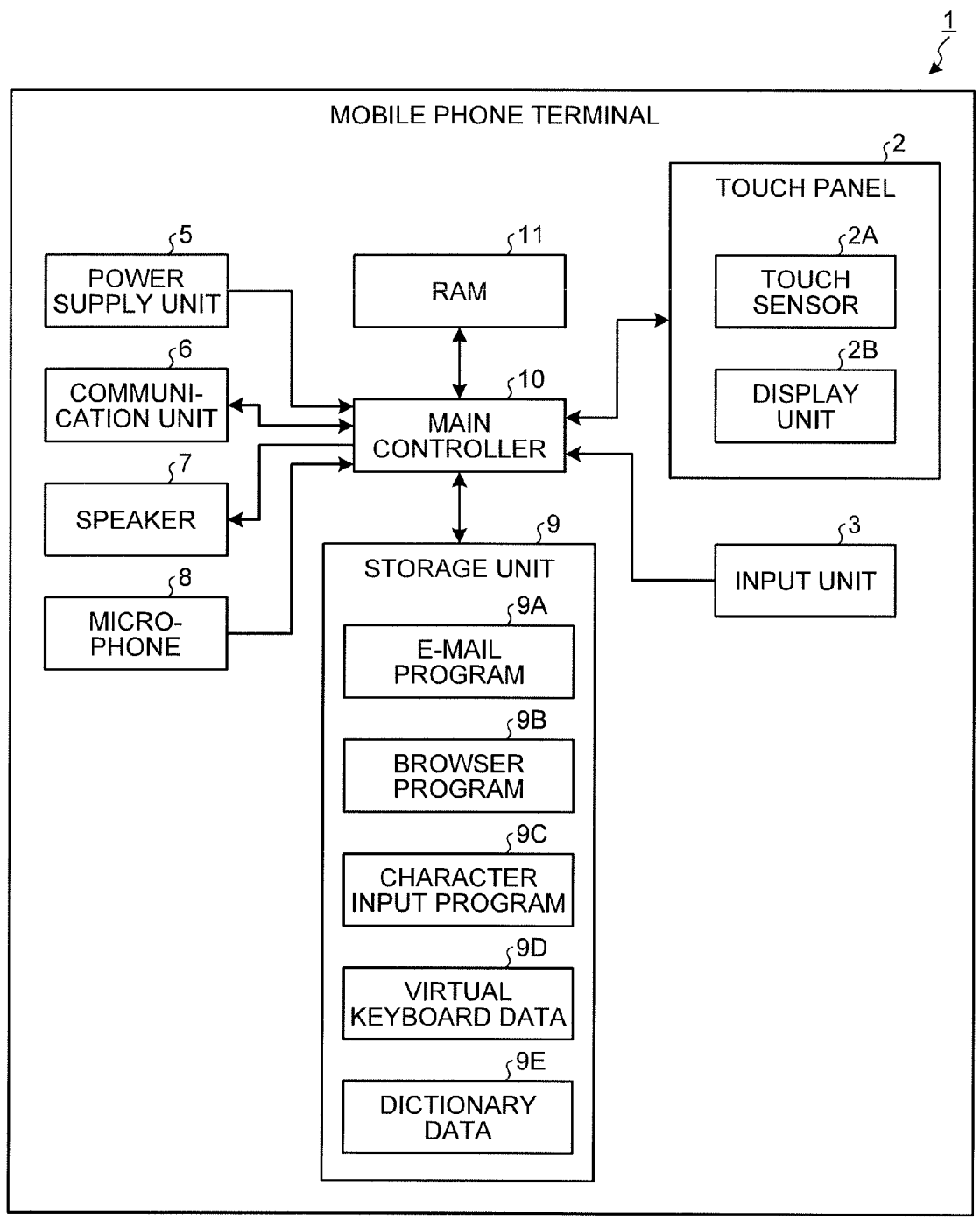
FIG. 7 is a block diagram of a schematic configuration of functions of the mobile phone according to the first embodiment.

The relationship between functions and a controller in the mobile phone 1 will now be described. FIG. 7 is a block diagram of a schematic configuration of the functions of the mobile phone 1 illustrated in FIG. 1. As illustrated in FIG. 7, the mobile phone 1 includes the touch panel 2, the input unit 3, a power supply unit 5, a communication unit 6, a speaker 7, a microphone 8, a storage unit 9, a main controller 10, and a random access memory (RAM) 11.

The touch panel 2 includes a display unit 2B and a touch sensor 2A superimposed on the display unit 2B. The touch sensor 2A detects various types of gestures made with respect to the touch panel 2 using the finger as well as a position in which the gesture is made on the touch panel 2. The gestures detected by the touch sensor 2A include a gesture of bringing the finger into contact with the surface of the touch panel 2, a gesture of moving the finger with the finger keeping the touch with the surface of the touch panel 2, and a gesture of pulling the finger away from the surface of the touch panel 2. The touch panel 2 may adopt any type of sensing method, such as a pressure-sensitive method, and a capacitive method. The display unit 2B is formed of a liquid crystal display (LCD), an organic electro-luminescence (EL) panel, for example, and displays a character, a figure, an image, and the like.

The input unit 3 receives an operation performed by the user via a physical button or the like, and transmits a signal corresponding to the operation thus received to the main controller 10. The power supply unit 5 supplies electricity acquired from a battery or an external power supply to each functional unit of the mobile phone 1 including the main controller 10. The communication unit 6 establishes a wireless signal path by a code division multiple access (CDMA) method, for example, with a base station via a channel allocated by the base station, and performs telephone communications and information communications with the base station. The speaker 7 outputs voice on the other side in the telephone communications, a ring tone, and the like. The microphone 8 converts voice of the user or the like into an electrical signal.

The storage unit 9 is a nonvolatile memory or a magnetic storage device, for example, and stores therein a computer program and data used for processing in the main controller 10. Specifically, the storage unit 9 stores therein an e-mail program 9A for transmitting and receiving an e-mail and reading an e-mail, a browser program 9B for browsing a Web page, a character input program 9C for receiving input of characters by the consecutive method described above, virtual keyboard data 9D including the definition related to the virtual keyboard displayed on the touch panel 2 when a character is input, and dictionary data 9E in which proper character strings are registered. The storage unit 9 also stores therein other computer programs and data, such as an operating system program that realizes basic functions of the mobile phone 1 and address book data in which names, phone numbers, and e-mail addresses are registered.

The main controller 10 is a central processing unit (CPU), for example, and controls operations of the mobile phone 1 integrally. Specifically, the main controller 10 executes the computer programs stored in the storage unit 9 while referring to the data stored in the storage unit 9 as necessary, and controls the touch panel 2, the communication unit 6, and other components, thereby performing various types of processing. The main controller 10 loads, as necessary, the computer programs stored in the storage unit 9 and data that is acquired, generated, and processed by performing the processing on the RAM 11 providing a temporary storage area. The computer programs executed by the main controller 10 and the data referred to by the main controller 10 may be downloaded from a server through wireless communications performed by the communication unit 6.

FIG. 8 illustrates an example of the virtual keyboard data 9D stored in the storage unit 9. As illustrated in the example of FIG. 8, in the virtual keyboard data 9D, a character corresponding to a button, the position (e.g., the top-left coordinates), the width, the height, and the like of the button are registered for each button included in the virtual keyboard. In the example illustrated in FIG. 8, it is registered that a character corresponding to a button is "Q", that the top-left coordinates of the button represent x=10 and Y=10, and that the width and the height of the button are 20 and 40, respectively.

Figure 9:
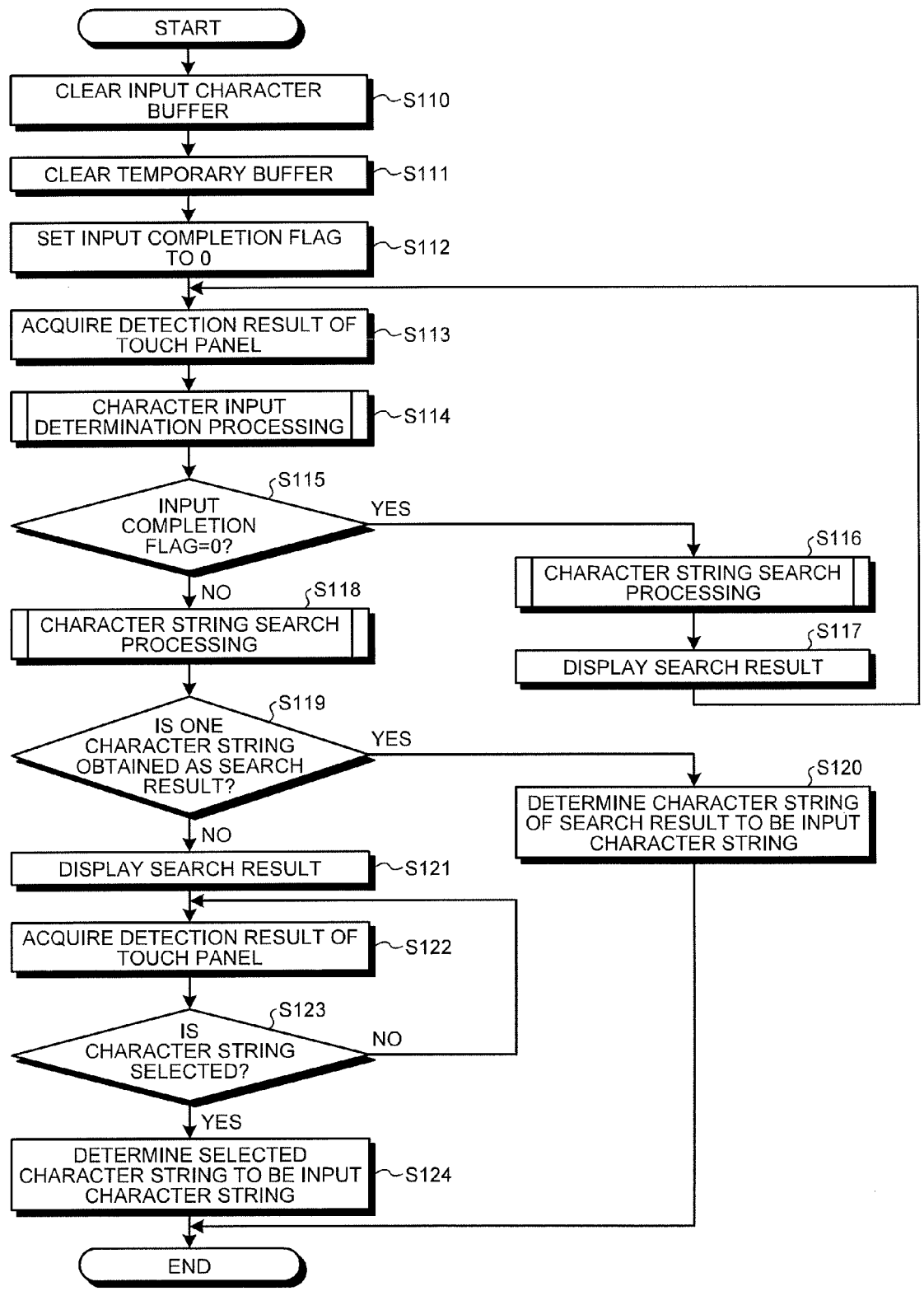
FIG. 9 is a flowchart of a process of character input processing performed by the mobile phone.

An operation performed when the mobile phone 1 receives input of characters will now be described. FIG. 9 is a flowchart of a process of character input processing performed by the mobile phone 1. The character input processing illustrated in FIG. 9 is realized by the main controller 10 reading and executing the character input program 9C from the storage unit 9. The character input processing is performed repeatedly while the virtual keyboard 4 is being displayed on the touch panel 2. The virtual keyboard 4 is displayed on the touch panel 2 by the main controller 10 executing the character input program 9C or another computer program.

The main controller 10 clears an input character buffer 12 at Step S110, and clears a temporary buffer 13 at Step S111. The input character buffer 12 is a storage area that stores therein a character corresponding to each button on the trajectory along which the finger moves while keeping the touch with the touch panel 2 in a manner associated with priority, and is included in the RAM 11. The temporary buffer 13 is a storage area that temporarily stores therein a character corresponding to a button determined to be a button across which the finger simply passes among buttons on the trajectory along which the finger moves while keeping the touch with the touch panel 2, and is included in the RAM 11.

Figure 10:
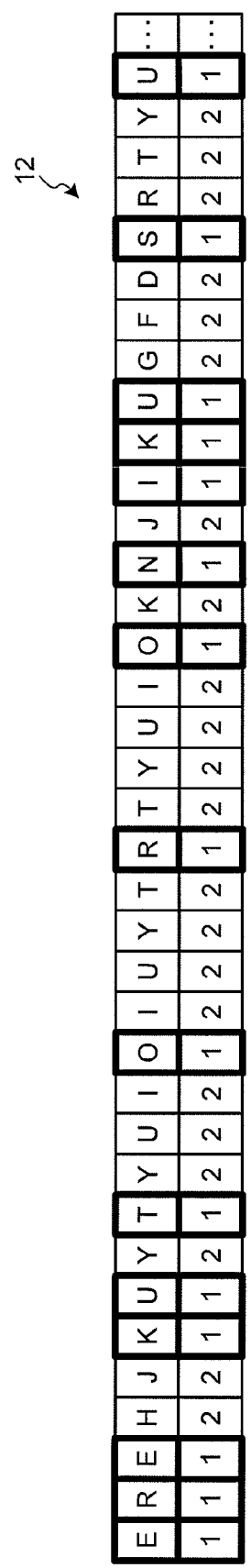
FIG. 10 is a diagram illustrating an example of an input character buffer.

An example of the input character buffer 12 is illustrated in FIG. 10. FIG. 10 illustrates the input character buffer 12 when the operation illustrated in FIG. 6 is performed on the touch panel 2. In the example illustrated in FIG. 10, the characters corresponding to the buttons on the trajectory along which the finger moves while keeping the touch with the touch panel 2 are stored in the upper row of the input character buffer 12, and the priority corresponding to each of the characters in the upper row is stored in the lower row. As illustrated in the example of FIG. 10, the input character buffer 12 stores therein the characters corresponding to the buttons on the trajectory along which the finger moves while keeping the touch with the touch panel 2 in chronological order.

The priority is used for determining whether to employ the character corresponding thereto when a character string is created by combining the characters included in the input character buffer 12. In the present embodiment, as the value of the priority is small, the character corresponding thereto is preferentially employed. Specifically, the main controller 10 assigns "1" as priority to a character corresponding to a button determined to be intentionally touched by the finger, and assigns "2" as priority to a character corresponding to a button determined to be a button across which the finger simply passes.

Figure 11:
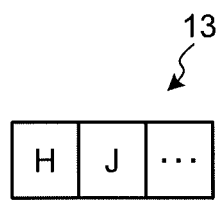
FIG. 11 is a diagram illustrating an example of a temporary buffer.

An example of the temporary buffer 13 is illustrated in FIG. 11. FIG. 11 illustrates the temporary buffer 13 at the point when the finger leaves the button "J" at s1 in FIG. 6. As illustrated in the example of FIG. 11, the temporary buffer 13 stores therein the characters corresponding to the buttons determined to be buttons across which the finger only passes in chronological order until any button is determined to be intentionally touched by the finger.

After clearing the input character buffer 12 and the temporary buffer 13, the main controller 10 sets an input completion flag included in the RAM 11 to 0 at Step S112. The input completion flag is used for determining whether input of characters at a time is completed. The input of characters at a time herein means input of characters performed from when the user brings the finger into contact with the touch panel 2 to when the user pulls the finger away therefrom.

Subsequently, the main controller 10 acquires the latest detection result of the touch panel 2 at Step S113, and performs character input determination processing at Step S114. In the character input determination processing, the main controller 10 stores a character corresponding to each button displayed on the trajectory along which the finger moves while keeping the touch with the touch panel 2 in the input character buffer 12 and the temporary buffer 13. The character input determination processing will be described later in detail.

After performing the character input determination processing, the main controller 10 determines whether the input completion flag remains to be 0 at Step S115. If the input completion flag remains to be 0, that is, if the input of characters at a time is not completed yet (Yes at Step S115), the main controller 10 performs character string search processing at Step S116, and searches for a character string that matches a character string obtained by combining the characters stored in the input character buffer 12 from the dictionary data 9E. The character string search processing will be described later in detail.

Figure 12:
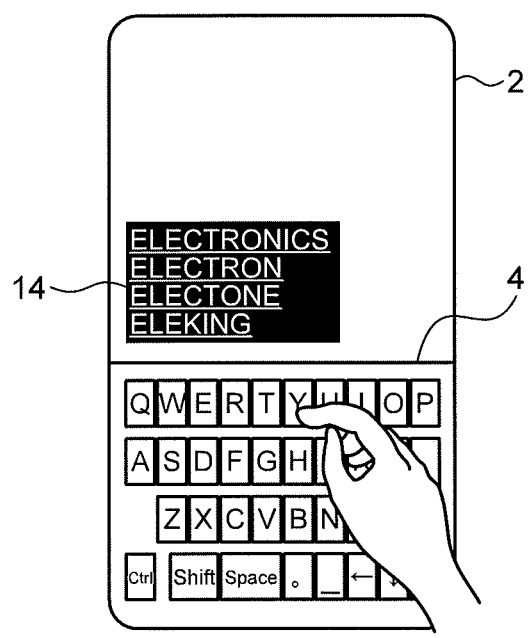
FIG. 12 is a diagram illustrating an input character string candidate display area displayed on the touch panel.

Subsequently, the main controller 10 displays one or a plurality of character strings obtained by the character string search processing in an input character string candidate display area 14 as illustrated in FIG. 12 at Step S117. The main controller 10 then performs the processing of Step S113 to Step S117 repeatedly until it is determined that the input completion flag is not 0, that is, it is determined that the input of characters at a time is completed at Step S115.

If the input completion flag is not 0 at Step S115 (No at Step S115), the main controller 10 performs the character string search processing at Step S118, and searches for a character string that matches a character string obtained by combining the characters stored in the input character buffer 12 from the dictionary data 9E. If one character string alone is obtained as the processing result of the character string search processing (Yes at Step S119), the main controller 10 receives a character string obtained as the processing result of the character string search processing as an input character string at Step S120.

By contrast, if a plurality of character strings are obtained as the processing result of the character string search processing (No at Step S119), the main controller 10 displays the character strings obtained as the processing result of the character string search processing in the input character string candidate display area 14 as illustrated in FIG. 12 at Step S121. Subsequently, the main controller 10 acquires the latest detection result of the touch panel 2 at Step S122, and determines whether any one of the character strings displayed in the input character string candidate display area 14 is selected at Step S123.

If none of the character strings is selected (No at Step S123), the main controller 10 performs the processing of Step S122 to Step S123 repeatedly until any one of the character strings is selected. If a gesture indicating cancel of the input, such as a gesture of the finger of the user coming into contact with an area other than the input character string candidate display area 14, is detected at Step S122, the main controller 10 may terminate the character input processing.

If any one of the character strings displayed in the input character string candidate display area 14 is selected at Step S123, (Yes at Step S123), the main controller 10 receives a character string thus selected as an input character string at Step S124.

Figure 13A:
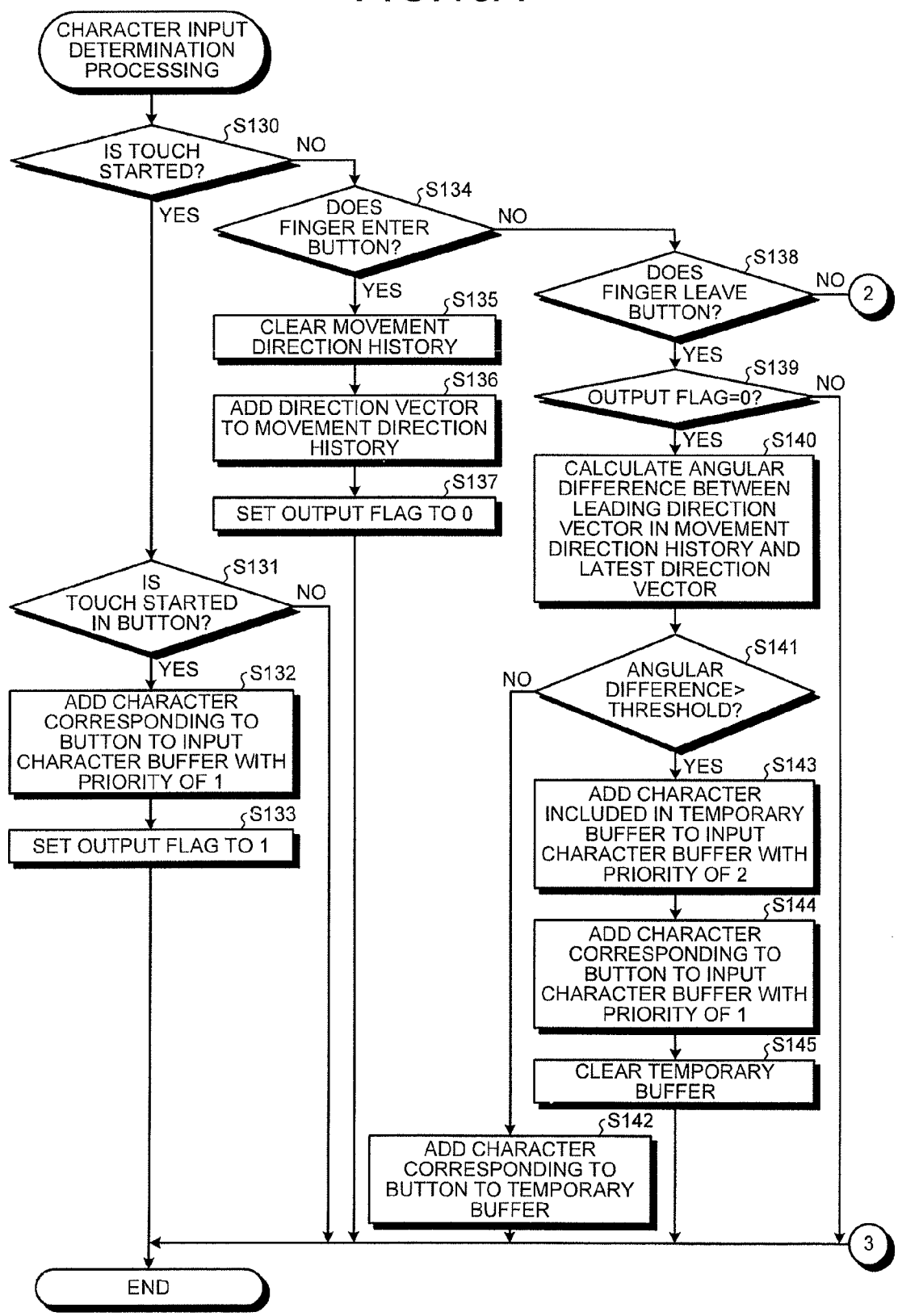
FIG. 13 is a flowchart of a process of character input determination processing.
Figure 13B:
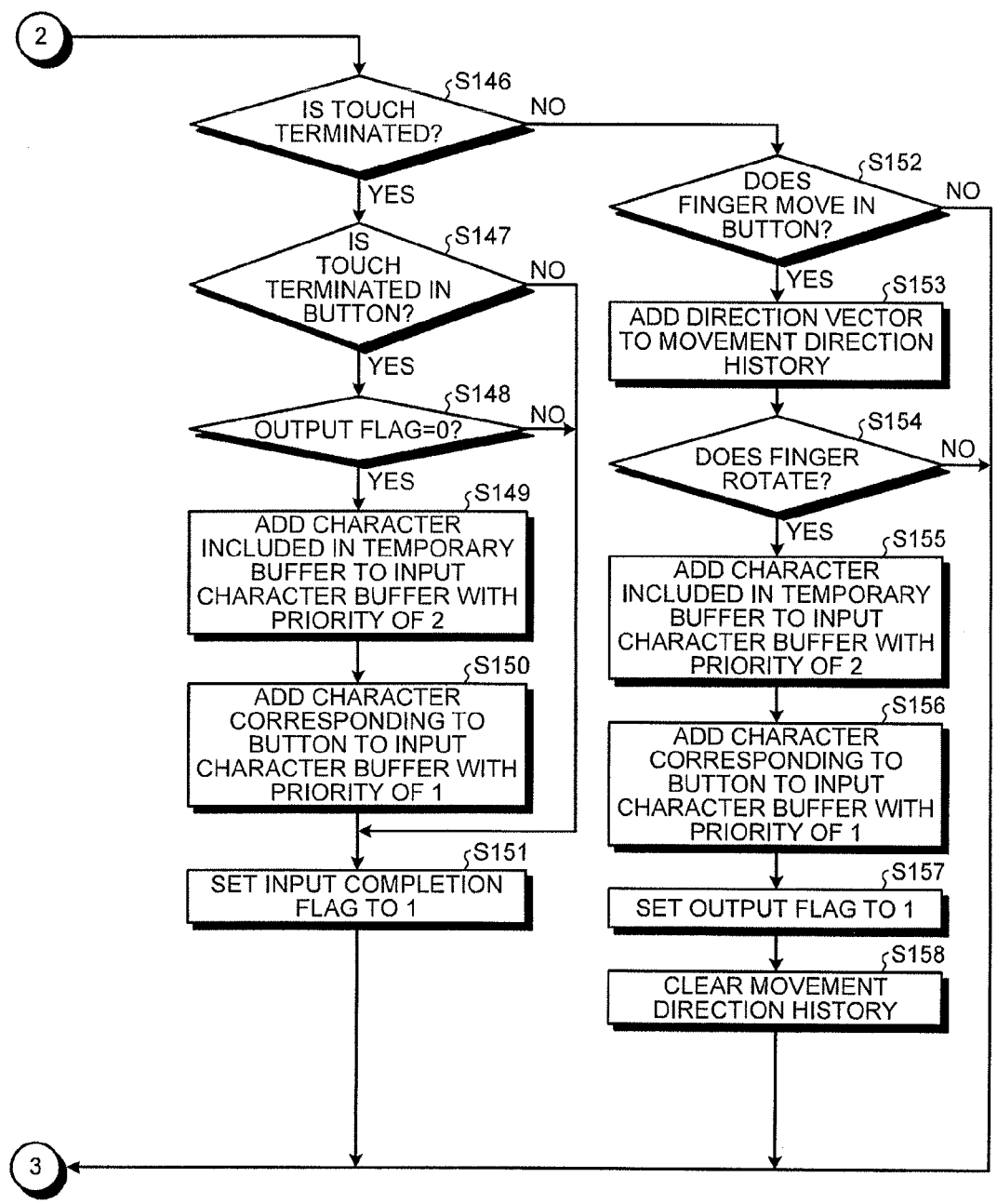

The character input determination processing performed at Step S114 in FIG. 9 will now be described with reference to a flowchart illustrated in FIG. 13. At Step S130, the main controller 10 determines whether the gesture detected through the touch panel 2 is a gesture of starting touch with the touch panel 2, that is, a gesture of bringing the finger into contact with the surface of the touch panel 2 based on the detection result of the touch panel 2.

If the gesture thus detected is the gesture of starting touch with the touch panel 2 (Yes at Step S130), the main controller 10 compares the position where the touch is started with the virtual keyboard data 9D, and determines whether the position where the touch is started is in any one of the button areas at Step S131. If the position where the touch is started is in any one of the button areas (Yes at Step S131), the button is assumed to be intentionally touched. Therefore, the main controller 10 adds a character corresponding to the button to the input character buffer 12 in a manner associated with priority "1" at Step S132. The character corresponding to the button is acquired from the virtual keyboard data 9D.

Subsequently, the main controller 10 sets an output flag to "1" at Step S133, and terminates the character input determination processing. The output flag is included in the RAM 11, and is used for determining whether the character corresponding to the button displayed at the position with which the finger is coming into contact has already been output to the input character buffer 12 or the temporary buffer 13. If the value of the output flag is "0", the character corresponding to the button displayed at the position with which the finger is coming into contact is yet to be output to neither of the buffers. By contrast, if the value of the output flag is "1", the character corresponding to the button displayed at the position with which the finger is coming into contact has already been output to either of the buffers.

At Step S131, if the position where the touch is started is not in a button area (No at Step S131), the main controller 10 terminates the character input determination processing without performing any processing in particular.

If the gesture detected through the touch panel 2 is not the gesture of starting touch with the touch panel 2 at Step S130 (No at Step S130), the main controller 10 determines whether the gesture detected through the touch panel 2 is a gesture of moving the finger into a button area with the finger keeping the touch with the touch panel 2 based on the detection result of the touch panel 2 at Step S134. Whether the gesture thus detected is the gesture of moving the finger into a button area with the finger keeping the touch with the touch panel 2 is determined by comparing the contact position indicated by the latest detection result of the touch panel 2 and the contact position indicated by the detection result prior thereto with the virtual keyboard data 9D.

If the gesture thus detected is the gesture of moving the finger into a button area with the finger keeping the touch with the touch panel 2 (Yes at Step S134), the main controller 10 clears a movement direction history at Step S135. The movement direction history is data in which a direction vector indicating which direction the finger moves in a button area is recorded in chronological order, and is stored in the RAM 11.

Subsequently, at Step S136, the main controller 10 acquires a direction vector indicating the direction in which the finger enters the button area, and adds the direction vector thus acquired to the movement direction history. The main controller 10 then sets the output flag to "0" at Step S137, and terminates the character input determination processing.

If the detection result of the touch panel 2 includes information indicating the direction of movement of the finger, the direction vector is obtained from the detection result of the touch panel 2. If the detection result of the touch panel 2 includes no information indicating the direction of movement of the finger, the direction vector is calculated from the contact position indicated by the latest detection result of the touch panel 2 and the contact position indicated by the detection result prior thereto.

If the gesture detected through the touch panel 2 is not the gesture of moving the finger into a button area with the finger keeping the touch with the touch panel 2 at Step S134 (No at Step S134), the main controller 10 determines whether the gesture detected through the touch panel 2 is a gesture of moving the finger out of a button with the finger keeping the touch with the touch panel 2 based on the detection result of the touch panel 2 at Step S138. Whether the gesture thus detected is the gesture of moving the finger out of a button with the finger keeping the touch with the touch panel 2 is determined by comparing the contact position indicated by the latest detection result of the touch panel 2 and the contact position indicated by the detection result prior thereto with the virtual keyboard data 9D.

If the gesture thus detected is the gesture of moving the finger out of a button with the finger keeping the touch with the touch panel 2 (Yes at Step S138), the main controller 10 determines whether the output flag is "0" at Step S139. If the output flag is not "0", that is, if the character corresponding to the button in which the finger has been positioned has already been output to either of the buffers (No at Step S139), the main controller 10 terminates the character input determination processing without performing any processing in particular.

By contrast, if the output flag is "0" (Yes at Step S139), the main controller 10 acquires the latest movement vector, that is, a direction vector indicating the direction in which the finger moves out of the button, and calculates the angular difference between the direction vector and the leading direction vector in the movement direction history at Step S140. The angular difference calculated at this time represents the magnitude of difference between the direction in which the finger enters the button and the direction in which the finger leaves the button.

If the angular difference thus calculated is not larger than a predetermined threshold (No at Step S141), the finger is assumed to simply pass across the button. Therefore, the main controller 10 adds the character corresponding to the button to the temporary buffer 13 at Step S142, and terminates the character input determination processing.

By contrast, if the angular difference thus calculated is larger than the predetermined threshold (Yes at Step S141), the button is assumed to be intentionally touched. Therefore, the main controller 10 performs processing of Step S143 and processing subsequent thereto such that the character corresponding to the button is stored in the input character buffer 12 together with characters corresponding to other buttons on the trajectory along which the finger moves in chronological order.

At Step S143, the main controller 10 adds the character(s) stored in the temporary buffer 13 to the input character buffer 12 in a manner associated with priority "2". Subsequently, at Step S144, the main controller 10 adds the character corresponding to the button to the input character buffer 12 in a manner associated with priority "1". The main controller 10 then clears the temporary buffer 13 at Step S145, and terminates the character input determination processing.

If the gesture detected through the touch panel 2 is not the gesture of moving the finger out of a button with the finger keeping the touch with the touch panel 2 at Step S138 (No at Step S138), the main controller 10 determines whether the gesture detected through the touch panel 2 is a gesture of terminating the touch with the touch panel 2, that is, a gesture of pulling the finger away from the touch panel 2 based on the detection result of the touch panel 2 at Step S146.

If the gesture thus detected is the gesture of terminating the touch with the touch panel 2 (Yes at Step S146), the main controller 10 compares the position where the touch is terminated with the virtual keyboard data 9D, and determines whether the position where the touch is terminated is in any one of the button areas at Step S147. If the position where the touch is terminated is in any one of the button areas (Yes at Step S147), the button is assumed to be intentionally touched. Therefore, the main controller 10 performs processing of Step S148 and processing subsequent thereto such that the character corresponding to the button is stored in the input character buffer 12 together with characters corresponding to other buttons on the trajectory along which the finger moves in chronological order.

At Step S148, the main controller 10 determines whether the output flag is "0". If the output flag is "0", that is, if the character corresponding to the button assumed to be intentionally touched is yet to be output to neither of the buffers (Yes at Step S148), the main controller 10 adds the character(s) stored in the temporary buffer 13 to the input character buffer 12 in a manner associated with priority "2" at Step S149. Subsequently, the main controller 10 adds the character corresponding to the button to the input character buffer 12 in a manner corresponding to priority "1" at Step S150.

The fact that the gesture of terminating the touch with the touch panel 2 is made indicates that the input of characters at a time is completed. Therefore, the main controller 10 sets the input completion flag to "1" at Step S151, and terminates the character input determination processing.

If the position where the touch is terminated is not in a button area (No at Step S147), or if the output flag is not "0" (No at Step S148), the main controller 10 performs processing for setting the input completion flag to "1" alone at Step S151, and terminates the character input determination processing.

If the position where the touch is terminated is not in a button area, or if the output flag is not "0", the character(s) stored in the temporary buffer 13 may be added to the input character buffer 12 in a manner associated with priority "2".

If the gesture detected through the touch panel 2 is not the gesture of terminating the touch with the touch panel 2 at Step S146 (No at Step S146), the main controller 10 determines whether the gesture detected through the touch panel 2 is a gesture of moving the finger in a button area with the finger keeping the touch with the touch panel 2 based on the detection result of the touch panel 2 at Step S152.

If the gesture thus detected is the gesture of moving the finger in a button area with the finger keeping the touch with the touch panel 2 (Yes at Step S152), the main controller 10 acquires a direction vector indicating the direction in which the finger moves in the button area, and adds the direction vector thus acquired to the movement direction history at Step S153. The main controller 10 then refers to each direction vector recorded in the movement direction history, and determines whether the finger moves to draw a rotational trajectory in the button area while keeping the touch with the touch panel 2 at Step S154.

If the finger moves to draw a rotational trajectory in the button area while keeping the touch with the touch panel 2 (Yes at Step S154), the button is assumed to be intentionally touched. Therefore, the main controller 10 performs processing Step S155 and processing subsequent thereto such that the character corresponding to the button is stored in the input character buffer 12 together with characters corresponding to other buttons on the trajectory along which the finger moves in chronological order.

At Step S155, the main controller 10 adds the character(s) stored in the temporary buffer 13 to the input character buffer 12 in a manner associated with priority "2". Subsequently, at Step S156, the main controller 10 adds the character corresponding to the button to the input character buffer 12 in a manner associated with priority "1". The main controller 10 then sets the output flag to "1" at Step S157, clears the movement direction history at Step S158, and terminates the character input determination processing.

If the gesture detected through the touch panel 2 is not the gesture of moving the finger in a button area with the finger keeping the touch with the touch panel 2, that is, if the finger moves outside the button on the virtual keyboard 4 at Step S152 (No at Step S152), the main controller 10 terminates the character input determination processing without performing any processing in particular.

If the gesture of moving the finger out of the virtual keyboard 4 with the finger keeping the touch with the touch panel 2 is detected, processing similar to the processing performed when the gesture of terminating the touch with the touch panel 2 is detected may be performed. Furthermore, if the gesture of moving the finger into the virtual keyboard 4 with the finger keeping the touch with the touch panel 2 is detected, processing similar to the processing performed when the gesture of starting the touch with the touch panel 2 is detected may be performed. With this configuration, the user can shift to next input swiftly while keeping the touch with the touch panel 2 without moving the finger up and down after completing input at a time.

Figures 14, 15:
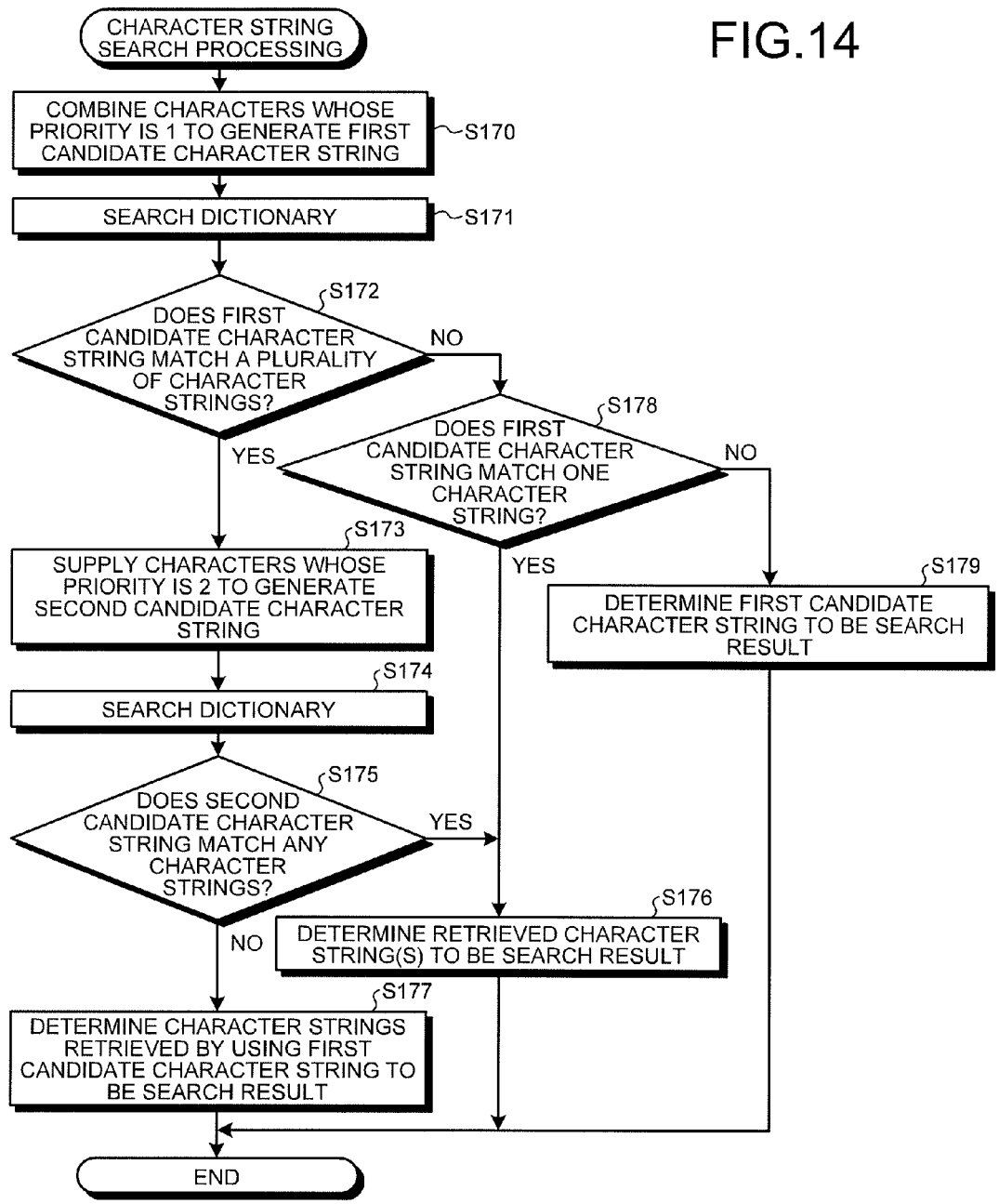
FIG. 14 is a flowchart of a process of character string search processing.
FIG. 15 is a diagram illustrating an example of the temporary buffer if priority is fractionized.

The character string search processing performed at Step S116 and Step S118 in FIG. 9 will now be described with reference to a flowchart illustrated in FIG. 14. At Step S170, the main controller 10 acquires characters whose priority is "1" from the input character buffer 12, and combines the characters thus acquired to generate a first candidate character string.

For example, an assumption is made that four characters of "A", "B", "C", and "D" are stored in the input character buffer 12 in this order, and that the priority of "A" and "D" is "1", and the priority of "B" and "C" is "2". In this case, the main controller 10 combines the characters whose priority is "1" in order of being stored, and generates a first candidate character string "AD".

Subsequently, at Step S171, the main controller 10 searches for a character string that matches the first candidate character string from the dictionary data 9E.

In the present embodiment, if the first candidate character string is "ABC", for example, a character string that matches a pattern of "A*B*C" is searched for from the dictionary data 9E. Note that "*" used herein is a wild card that matches an arbitrary character. In other words, in the present embodiment, a character string whose leading character is identical to the leading character of the first candidate character string and in which characters subsequent to the leading character of the first candidate character string appear in the same order as that of the first candidate character string with zero or more characters interposed therebetween is searched for as a character string that matches the first candidate character string.

Performing the matching in this manner can increase the possibility of identifying the input character string properly even if there is a button that fails to be determined to be intentionally touched by the finger.

If a plurality of character strings are obtained as the search result (Yes at Step S172), to narrow down the search result, the main controller 10 acquires a character whose priority is "2" from the input character buffer 12, and supplies the character thus acquired to the first candidate character string, thereby generating one or a plurality of second candidate character strings at Step S173.

Similarly to the example described above, for example, an assumption is made that four characters of "A", "B", "C", and "D" are stored in the input character buffer 12 in this order, and that the priority of "A" and "D" is "1", and the priority of "B" and "C" is "2". In this case, the main controller 10 supplies at least one of the characters whose priority is "2" to "AD", which is the first candidate character string, while observing the order of being stored, thereby generating three second candidate character strings of "ABD", "ACD", and "ABCD".

Subsequently, at Step S174, the main controller 10 searches for a character string that matches any one of the second candidate character strings from the dictionary data 9E. The matching method is the same as that for the first candidate character string.

If any of the character strings is retrieved at Step S174 (Yes at Step S175), the main controller 10 determines the character string(s) thus retrieved as the search result at Step S176, and terminates the character string search processing. By contrast, if none of the character strings is retrieved at Step S174 (No at Step S175), the main controller 10 determines the character strings that match the first candidate character string at Step S171 to be the search result at Step S177, and terminates the character string search processing.

If one character string alone is obtained as the search result at Step S171 (No at Step S172 and Yes at Step S178), the main controller 10 determines the character string thus retrieved to be the search result at Step S176, and terminates the character string search processing. If no character string is obtained as the search result at Step S171 (No at Step S178), the main controller 10 determines the first candidate character string, that is, the character string obtained by combining the characters whose priority is "1" in order of being stored to be the search result at Step S179, and terminates the character string search processing.

As described above, the mobile phone 1 allows the user to input characters by moving the finger on the virtual keyboard without pulling the finger away from the touch panel 2, thereby realizing input of characters at high speed.

The configuration of the mobile phone 1 can be changed arbitrarily without departing from the spirit and scope of the present invention. In the present embodiment, for example, "1" or "2" is assigned as priority to a character corresponding to each button on the trajectory along which the finger moves without being away from the touch panel 2. However, the priority assigned to the characters may be further fractionized.

For example, "1" may be assigned as priority to a character corresponding to a button determined to be intentionally touched, and any one of "2" to "5" may be assigned as priority to a character corresponding to a button determined to be a button across which the finger simply passes. If priority is fractionized, the priority is assigned to each of the characters stored in the temporary buffer 13 as illustrated in the example of FIG. 15 in the character input determination processing illustrated in FIG. 13.

In this case, for example, for the character corresponding to the button determined to be a button across which the finger only passes, higher priority may be assigned to the character as the angular difference between the movement direction in which the finger enters the button and the movement direction in which the finger leaves the button is larger. This is because the larger the angular difference is, the more likely it is that the button is intentionally touched.

Alternatively, for the character corresponding to the button determined to be a button across which the finger only passes, higher priority may be assigned to the character as the trajectory along which the finger moves is positioned closer to the center of the button. This is because the closer to the center of the button the trajectory along which the finger moves is, the more likely it is that the button is intentionally touched.

If the priority is fractionized in this manner, a character having higher priority is used preferentially when the second candidate character string is created in the character string search processing. Specifically, if a plurality of character strings match the first candidate character string obtained by combining the characters whose priority is "1", a character whose priority is "2" is supplied to the first candidate character string so as to narrow down the search result. If a plurality of character strings still match the first candidate character string even if the character whose priority is "2" is supplied, a character whose priority is "3" is further supplied to the first candidate character string so as to narrow down the search result.

In the same manner hereinafter, the characters are used for the supplement in order of having higher priority until the search result is narrowed down to one character string. Fractionizing the priority in this manner makes it possible to generate a character string to be verified by combining the characters in order of being likely to be intentionally touched. Accordingly, the identification accuracy of the input character string can be improved.

In the character input processing explained with reference to FIG. 9, every time the main controller 10 acquires a new detection result from the touch panel 2, the main controller 10 displays the character string thus retrieved in the input character string candidate display area 14. However, the main controller 10 may not perform such display until input of characters at a time is completed. Alternatively, only when the input of characters at a time is completed and a plurality of character strings are retrieved in the character string search processing, the main controller 10 may display the character strings thus retrieved in the input character string candidate display area 14.

In terms of the matching processing with the dictionary data in the character string search processing explained with reference to FIG. 14, another matching method, such as perfect matching and prefix matching, may be employed. Furthermore, an input prediction technology may be used to predict a character string that the user intends to input, and the character string thus predicted may be treated as the search result. The input prediction technology is a technology for predicting a character string that the user intends to input from character strings that have already been input and a character string that is being input based on the strength of combination of the character string, the frequency of use of the character string, and other factors.

In the embodiment described above, a character corresponding to a button displayed at a position where a predetermined gesture is detected is prioritized to identify the input character string among characters corresponding to buttons displayed on the trajectory along which the finger moves while keeping the touch with the touch panel 2. However, the present invention is not limited thereto, and a character string including characters corresponding to buttons displayed on the trajectory along which the finger moves while keeping the touch with the touch panel 2 or buttons displayed in the vicinity thereof may be received as the input character string.

In the embodiment described above, the gesture of coming into contact with the touch panel 2 in the button area, the gesture of pulling the finger away from the touch panel 2 in the button area, and other gestures are explained as the predetermined gesture. However, these gestures are just examples of the predetermined gesture, and another gesture may be treated as the predetermined gesture.

Second Embodiment

A mobile phone 21 serving as another embodiment of the information processing device according to the present invention will now be described. The mobile phone 21 has the same appearance as that of the mobile phone 1 illustrated in FIG. 1. The mobile phone 21 displays an object browsing screen used for browsing an object on a touch panel 2, and receives input of attribute information of an object being displayed on the object browsing screen from the touch panel 2.

The object used herein means data on which the mobile phone 21 performs various types of processing, such as display, reproduction, and editing, and corresponds to image data, video data, music data, a word processing document, an e-mail, and personal data in an address book, for example. The object browsing screen used herein means a screen for displaying an icon, such as a thumbnail, corresponding to an object sequentially in predetermined order to select and brows the object. The attribute information used herein means character information indicating attributes of an object, and is a file name, a title, a comment, and a name of its creator, for example. If the object is personal data in the address book, the attribute information also includes a name, a phone number, an e-mail address, and the like.

Operations performed by the mobile phone 21 that is displaying the object browsing screen will now be described with reference to FIG. 16. At s21, the mobile phone 21 is displaying the object browsing screen on the touch panel 2 in response to a predetermined operation performed by the user. Specifically, the mobile phone 21 is displaying an icon of an object OB2 that is a current target to be operated in a large size at the center of the touch panel 2. Furthermore, an icon of an object OB1 previous to the object OB2 in a display order is being displayed in a relatively small size on the right side of the icon of the object OB2, and an icon of an object OB3 subsequent to the object OB2 in the display order is being displayed in a relatively small size on the left side of the icon of the object OB2. On the object browsing screen, character data, such as a file name of an object, may be displayed in the vicinity or inside of an icon.

If the user makes a gesture of tapping the icon of the object OB2 while the object browsing screen is being displayed, the mobile phone 21 detects the gesture through the touch panel 2, and performs predetermined processing, such as enlarged display, reproduction, and shift of the state to an editable state, on the object OB2. Tapping herein means a gesture of bringing the finger into contact with the touch panel 2 and pulling the finger away therefrom promptly.

If the user makes a gesture of bringing the finger into contact with the touch panel 2 in a display area of the icon of the object OB2 as illustrated in s22 and moving the finger to the right with the finger keeping the contact with the touch panel 2 as illustrated in s23 while the object browsing screen is being displayed, the mobile phone 21 detects the gesture through the touch panel 2, and causes the icon to shift to the right.

As a result, the icon of the object OB3 is displayed in a large size at the center of the touch panel 2 as the current target to be operated as illustrated in s24. Furthermore, the icon of the object OB2 that has been the target to be operated is displayed in a relatively small size on the right side of the icon of the object OB3, and an icon of an object OB4 subsequent to the object OB3 in the display order is displayed in a relatively small size on the left side of the icon of the object OB3.

By contrast, if the user makes a gesture of bringing the finger into contact with the touch panel 2 in the display area of the icon of the object OB2 as illustrated in s22 and moving the finger to the left with the finger keeping the contact with the touch panel 2, the mobile phone 21 detects the gesture through the touch panel 2, and causes the icon to shift to the left.

As described above, by performing an intuitive operation on an icon on the touch panel 2 while referring to the icon of the object and confirming contents of the object on the object browsing screen, the user can perform selection, browsing, and other operations on the object.

Furthermore, the object browsing screen of the mobile phone 21 facilitates the user's inputting of attribute information of an object corresponding to an icon displayed on the touch panel 2. If the user brings the finger into contact with the touch panel 2 in the display area of the icon of the object OB2 as illustrated in s22 while the object browsing screen is being displayed, the mobile phone 21 displays a virtual keyboard 4 on the touch panel 2. The virtual keyboard 4 includes a plurality of virtual buttons resembling keys of a physical keyboard.

If the user makes a gesture of moving the finger into the virtual keyboard 4 with the finger keeping the contact with the touch panel 2 as illustrated in s25, the mobile phone 21 is ready to receive input of attribute information of the object OB2 from the virtual keyboard 4. Subsequently, the mobile phone 21 identifies a character string input by the user with the virtual keyboard 4, and displays the character string thus identified on an input character display screen 15 as illustrated in s26.

At this time, the mobile phone 21 receives input of characters by the consecutive method as well as input of characters by a method in which each button in the virtual keyboard 4 is tapped. As described above, the consecutive method allows the user to input a plurality of characters only by moving the finger on the touch panel 2 in a sliding manner without making a gesture of moving the finger up and down for each button. As a result, the user can input the characters at extremely high speed. In particular, in a case where the user moves the finger from the display area of the icon of the object OB2 into the virtual keyboard 4 with the finger keeping the contact with the touch panel 2, and then inputs characters as illustrated in s25 of FIG. 16, the consecutive method is extremely advantageous for inputting characters at high speed since the user can input the characters while keeping the finger into contact with the touch panel 2 without moving the finger up and down.

If input of the attribute information is completed, and the user instructs to save the attribute information by tapping a save button in the input character display screen 15, for example, the mobile phone 21 displays an attribute selection screen 16 as illustrated in s27. The attribute selection screen 16 is a screen that receives selection of which attribute information to be allocated for saving the input character string, and includes options such as "file name", "title", and "comment".

The options displayed in the attribute selection screen 16 vary depending on the type of the object. The mobile phone 21 may allow the user to select which attribute information to be allocated for saving the input character string in advance, instead of displaying the attribute selection screen 16 every time attribute information is received and receiving selection of which attribute information to be allocated for saving the input character string.

If any one of the options is selected on the attribute selection screen 16, the mobile phone 21 stores therein the input character string as attribute information corresponding to the option thus selected in a manner associated with the object OB2. The mobile phone 21 then deletes the virtual keyboard 4 and the attribute selection screen 16 as illustrated in s28, and restores the object browsing screen to the state similar to the state of s21.

To further input attribute information of another object, the user performs the operation as illustrated in s23 to display an icon of an intended object, and performs the operations illustrated in s25 to s27, thereby input the attribute information.

As described above, the mobile phone 21 allows the user to input attribute information of an object without pulling the finger away from the touch panel 2 while displaying the object browsing screen on which the user can change objects to be operated arbitrarily. Therefore, the user can input the attribute information of the object swiftly.

Figure 17:
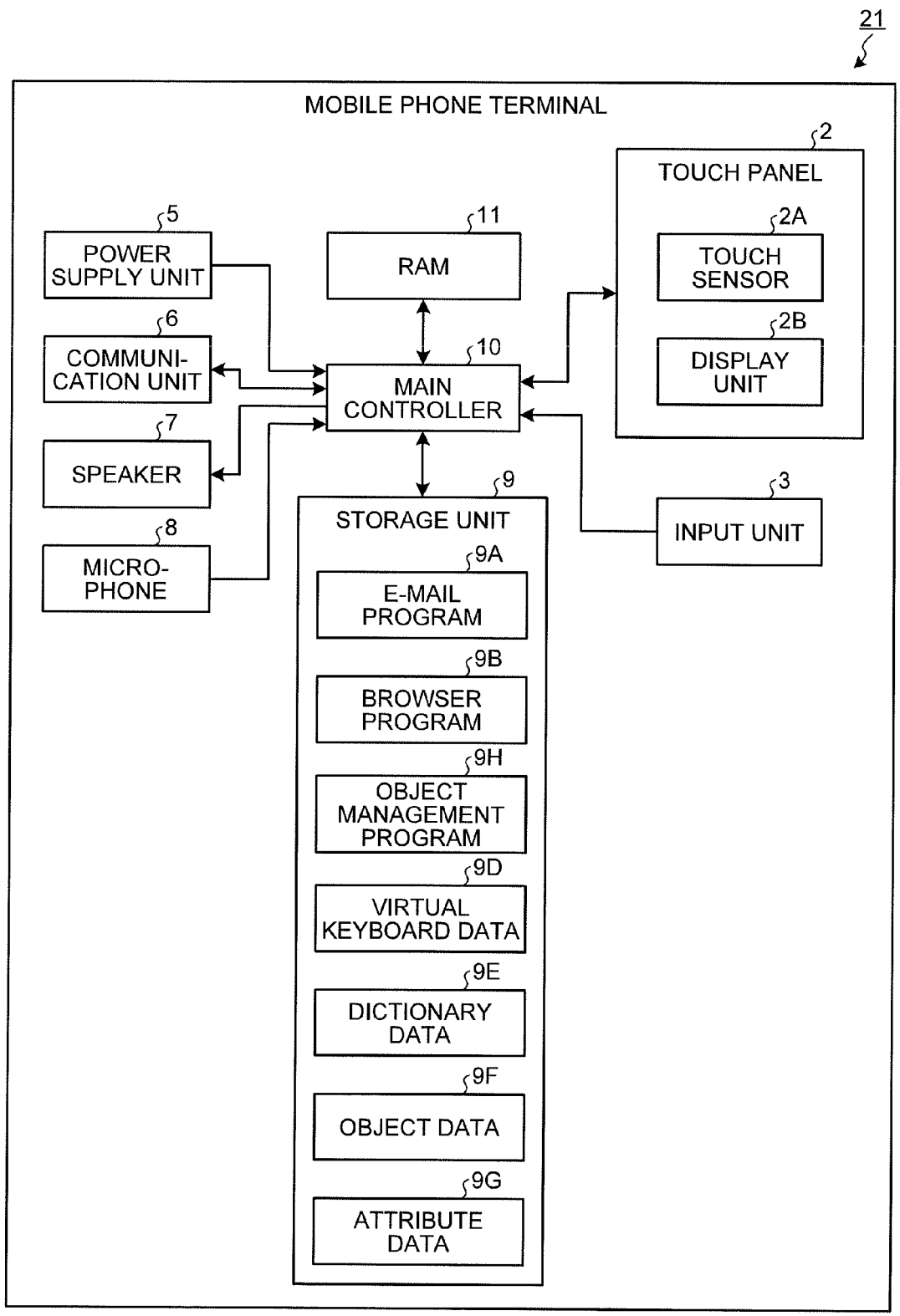
FIG. 17 is a block diagram of a schematic configuration of functions of a mobile phone according to a second embodiment.

The relationship between functions and the controller in the mobile phone 21 will now be described. FIG. 17 is a block diagram of a schematic configuration of the functions of the mobile phone 21. As illustrated in FIG. 17, the mobile phone 21 has the same configuration as that of the mobile phone 1 except that a storage unit 9 further stores therein an object management program 9H used for displaying the object browsing screen, updating attribute information, and other operations, object data 9F that is a main body of an object, and attribute data 9G in which attribute information of an object is stored. The storage unit 9 may store therein a character input program 9C, which is omitted in FIG. 17.

The object data 9F is associated with the attribute data 9G by using a common ID, for example. Attribute information of an object may be embedded in the object data 9F instead of being stored in the attribute data 9G.

Figure 18:
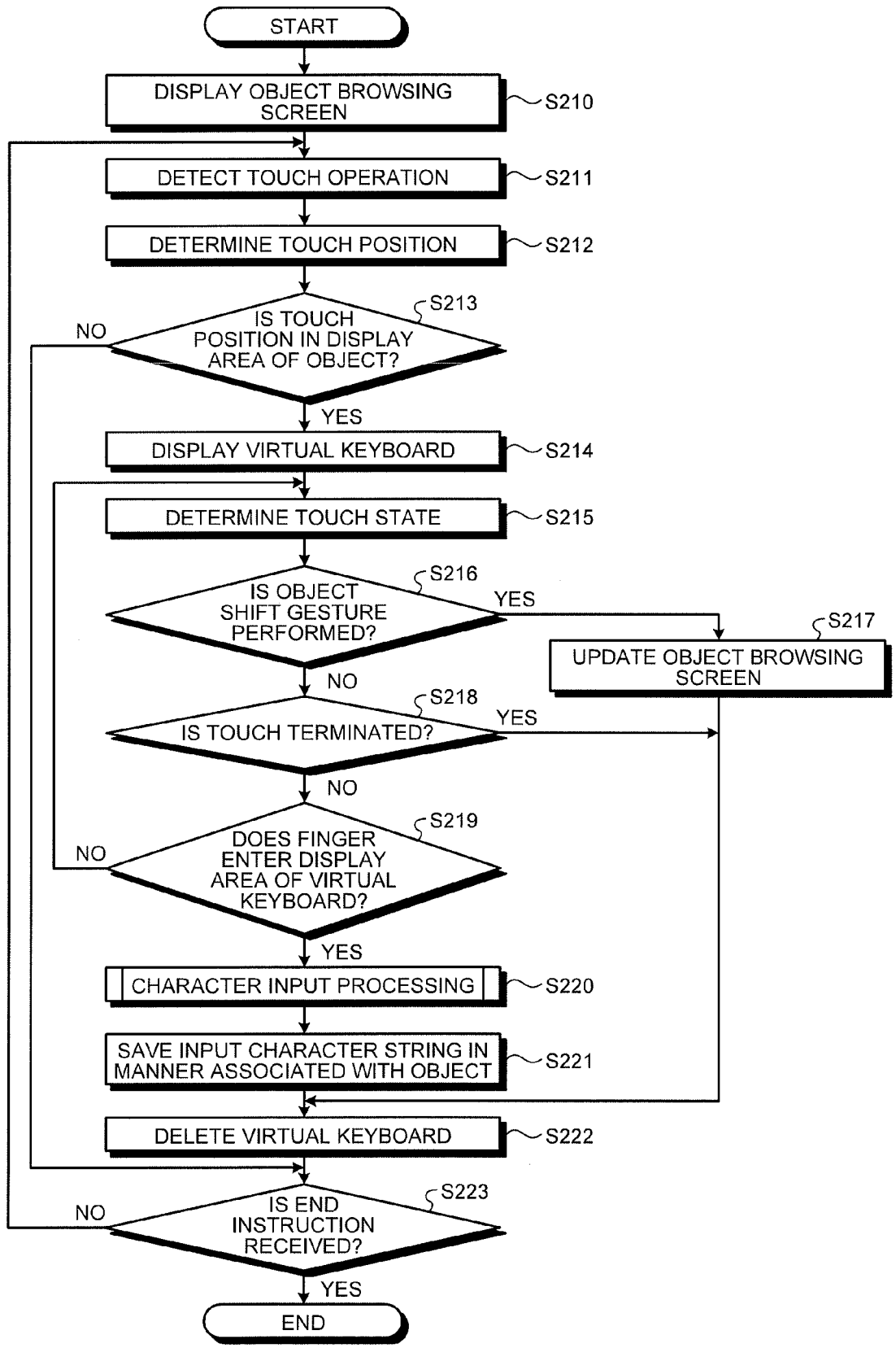
FIG. 18 is a flowchart of a process of attribute information input processing.

The operation performed when the mobile phone 21 receives input of attribute information of an object will now be described. FIG. 18 is a flowchart of a process of attribute information input processing performed by the mobile phone 21. The attribute information input processing illustrated in FIG. 18 is realized by a main controller 10 reading and executing the object management program 9H from the storage unit 9. The mobile phone 21 can perform processing, such as reproduction and editing, on an object from the object browsing screen. However, the operation of the mobile phone 21 will be described below focusing on input of attribute information.

The main controller 10 of the mobile phone 21 displays the object browsing screen on the touch panel 2 at Step S210. When the touch panel 2 detects a touch operation in which the finger comes into contact with the touch panel 2 at Step S211, the main controller 10 determines the position at which the finger comes into contact with the touch panel 2 based on the detection result of the touch panel 2 at Step S212. If the position with which the finger comes into contact is not in a display area of an icon of an object displayed on the object browsing screen (No at Step S213), the main controller 10 determines whether an end instruction is received at Step S223. If the end instruction is received (Yes at Step S223), the attribute information input processing is terminated. By contrast, if no end instruction is received (No at Step S223), the processing is reperformed from Step S211.

If the position with which the finger comes into contact is in a display area of an icon of an object displayed on the object browsing screen (Yes at Step S213), the main controller 10 displays the virtual keyboard 4 on the touch panel 2 at Step S214. Displaying the virtual keyboard 4 dynamically in this manner facilitates the user's intuitive understanding of that the state can be shifted to the state to input attribute information of the object. Subsequently, the main controller 10 monitors the detection result of the touch panel 2, and determines the touch state of the finger with the touch panel 2 at Step S215.

If an object shift gesture (e.g. the operation at s23 in FIG. 16) for changing objects to be displayed as an icon on the object browsing screen is determined to be made (Yes at Step S216), the main controller 10 changes objects to be displayed as an icon on the object browsing screen in response to the object shift gesture at Step S217. The main controller 10 then deletes the virtual keyboard 4 at Step S222, and determines whether an end instruction is received at Step S223. If the end instruction is received (Yes at Step S223), the attribute information input processing is terminated. By contrast, if no end instruction is received (No at Step S223), the processing is reperformed from Step S211.

If the finger is determined to be pulled away from the touch panel 2 (touch termination) as a result of determination of the touch state of the finger with the touch panel 2 (No at Step S216 and Yes at Step S218), the main controller 10 deletes the virtual keyboard 4 at Step S222, and determines whether an end instruction is received at Step S223. If the end instruction is received (Yes at Step S223), the attribute information input processing is terminated. By contrast, if no end instruction is received (No at Step S223), the processing is reperformed from Step S211.

If the finger is determined to enter the display area of the virtual keyboard 4 while keeping the touch with the touch panel 2 as a result of determination of the touch state of the finger with the touch panel 2 (No at Step S218 and Yes at Step S219), the main controller 10 performs the character input processing described above at Step S220, and receives an input character string as attribute information.

Subsequently, the main controller 10 stores the input characters in a manner associated with the object data 9F corresponding to the icon on which the finger is placed at Step S212 as the attribute data 9G in the storage unit 9 at Step S221. The main controller 10 then deletes the virtual keyboard 4 at Step S222, and determines whether an end instruction is received at Step S223. If the end instruction is received (Yes at Step S223), the attribute information input processing is terminated. By contrast, if no end instruction is received (No at Step S223), the processing is reperformed from Step S211.

If no object shift gesture, no touch termination, or no entrance of the finger into the display area of the virtual keyboard 4 is detected as a result of determination of the touch state of the finger with the touch panel 2 (No at Step S219), the main controller 10 returns to Step S215, and monitors the detection result of the touch panel 2 to determine the touch state of the finger with the touch panel 2.

As described above, the mobile phone 21 allows the user to start inputting of attribute information without shifting the state of an object to another state, such as an editing state, while displaying the object browsing screen on which the user can change objects to be operated arbitrarily. Therefore, the user can input attribute information of a plurality of objects swiftly.

Furthermore, the mobile phone 21 allows the user to perform the operations from selection of an object on the object browsing screen to input of attribute information of the object without pulling the finger away from the touch panel 2. Therefore, the user can input the attribute information of the object at high speed.

The configuration of the mobile phone 21 can be changed arbitrarily without departing from the spirit and scope of the present invention. For example, the object management program 9H may be configured integrally with another computer program, or may be divided into a plurality of computer programs. The object management program 9H may be divided into a computer program that performs display of the object browsing screen and reproduction and editing of an object, and into a computer program (character input program 9C) that displays the virtual keyboard 4 and receives input of characters, for example. The function of the object management program 9H may be included in the character input program 9C.

In terms of input of characters by the consecutive method, various types of modifications explained in the first embodiment can be applied to the second embodiment.

Figure 16:
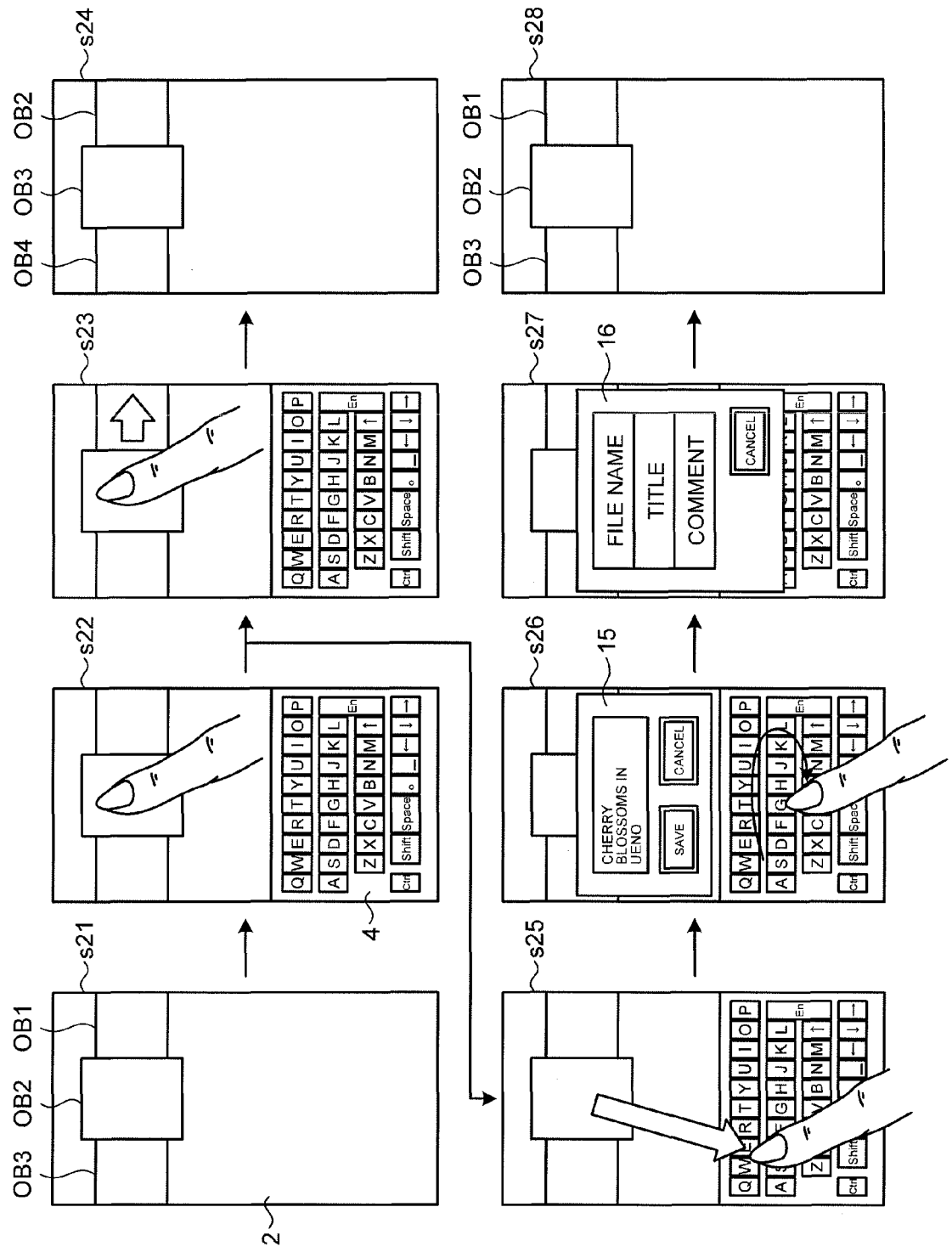
FIG. 16 is a diagram illustrating an example of an operation performed by the mobile phone that is displaying an object browsing screen.

If a predetermined gesture is detected in a display area of a button or an option on the input character display screen 15 and the attribute selection screen 16 illustrated in FIG. 16, the button or the option may be selected.

The object browsing screen explained in the embodiment described above is just an example, and may have a different screen configuration and different operability. Other examples of the object browsing screen are illustrated in FIG. 19 and FIG. 20.

On the object browsing screen illustrated in FIG. 19, three icons corresponding to objects OB1 to OB3 are displayed side by side in the same size as illustrated in s41. In this state, if the user places the finger in a display area of any one of the icons, and moves the finger to the right or the left with the finger keeping the contact with the touch panel 2, the icon shifts in response to the gesture in the same manner as in s23 to s24 of FIG. 16. As a result, an icon of another object is displayed on the object browsing screen.

If the user places the finger in a display area of any one of the icons, the virtual keyboard 4 is displayed in the same manner as in s22 of FIG. 16. Subsequently, if the user moves the finger into the virtual keyboard 4 with the finger keeping the contact with the touch panel 2, the mobile phone 21 is ready to receive input of attribute information from the virtual keyboard 4 in the same manner as in s26 of FIG. 16.

Furthermore, if the user performs a predetermined operation to make a plurality of icons in a selected state, and then places the finger in a display area of an icon in the selected state as illustrated in s42, the mobile phone 21 displays the virtual keyboard 4. Subsequently, if the user moves the finger into the virtual keyboard 4 with the finger keeping the contact with the touch panel 2 as illustrated in s43, the mobile phone 21 is ready to receive input of attribute information from the virtual keyboard 4, and displays a received character string on the input character display screen 15 as illustrated in s44.

If input of the attribute information is completed, and the user instructs to save the attribute information by tapping a save button in the input character display screen 15, for example, the mobile phone 21 saves the input character string in a manner associated with the objects corresponding to the icon in the selected state as the attribute information. Upon saving the attribute information, the attribute selection screen 16 illustrated in FIG. 16 may be displayed, so that the user can select which attribute information to be allocated for saving the input character string.

On the object browsing screen illustrated in FIG. 20, an icon of an object OB1 that is a target to be operated or contents of the object is displayed full-screen on the touch panel 2 as illustrated in s51. If the user places the finger on any one of four corners of the touch panel 2, and moves the finger in a diagonal direction with the finger keeping the contact with the touch panel 2 as illustrated in s52, a part of the object OB1 is turned up in association with the movement of the finger, whereby an object OB2 subsequent to the object OB1 in the display order is displayed in a manner exposed from below.

If the user continues the movement of the finger, the mobile phone 21 displays the virtual keyboard 4 at a certain point as illustrated in s53. If the user further continues the movement of the finger, the object OB2 replaces the object OB1 as a target to be operated, and is displayed full-screen on the touch panel 2 as illustrated in s54.

If the user moves the finger into the virtual keyboard 4 with the finger keeping the contact with the touch panel 2 while the virtual keyboard 4 is being displayed as illustrated in s55, the mobile phone 21 is ready to receive input of attribute information from the virtual keyboard 4, and displays a received character string on the input character display screen 15 as illustrated in s56.

If input of the attribute information is completed, and the user instructs to save the attribute information by tapping a save button in the input character display screen 15, for example, the mobile phone 21 displays the attribute selection screen 16 as illustrated in s57. If any one of the options is selected on the attribute selection screen 16, the mobile phone 21 stores therein the input character string as attribute information corresponding to the option thus selected in a manner associated with the object OB1. The mobile phone 21 then deletes the virtual keyboard 4 and the attribute selection screen 16 as illustrated in s58, and restores the object browsing screen to the state similar to the state of s51.

The invention claimed is:

1. An information processing device, comprising:
   a touch panel; and
   a controller configured to display a virtual keyboard including a plurality of buttons on the touch panel,
   wherein the controller is configured to receive input of a character through the virtual keyboard when (i) the touch panel detects a contact to a first button among the plurality of buttons, the first button associated with the character, (ii) the contact slides, on the virtual keyboard, to a second button among the plurality of buttons, and (iii) an angular difference between a direction of entering to the first button and a direction of leaving from the first button is larger than a threshold value, and store information of the received character, and
   wherein the controller is further configured, when a predetermined gesture is performed, the predetermined gesture being a gesture in which a user of the information processing device places a finger on any one of four corner regions of the touch panel and moves the finger in a diagonal direction toward a corner region which is opposite to the corner region on which the finger is placed while keeping the finger in contact with the touch panel,
   to turn up a part of a displayed first object in the diagonal direction in which the finger moves, and to display a subsequent second object exposed in an area below the part being turned up, and
   the controller being configured to, when the finger moves to a predetermined point on the touch panel, display the virtual keyboard in the area below the first object and the subsequent second object, and
   when the finger moves into an area of the virtual keyboard from the predetermined point while continuing to maintain contact with the touch panel, the controller is configured to cause the first object to receive input of a character string through the virtual keyboard.

2. The information processing device according to claim 1, wherein
   when the predetermined gesture is performed subsequently to a start of the contact in a display area,
   the controller is configured to change an object to be displayed on the touch panel in accordance with a predetermined display order.

3. The information processing device according to claim 1, wherein
   when the contact is detected while a plurality of objects displayed on the touch panel are in a selected state,
   the controller is configured to store the information of the received character through the virtual keyboard.

4. The information processing device according to claim 1, wherein the controller is configured to continue the turning up of the first object after displaying the virtual keyboard while the predetermined gesture is continued.

5. The information processing device according to claim 1, wherein when the predetermined gesture is continued and the subsequent second object is displayed full-screen on the touch panel, the controller is configured to set the subsequent second object as a target to be operated.

6. A character input method performed by an information processing device including a touch panel, the character input method comprising:
- displaying, by the touch panel, a virtual keyboard including a plurality of buttons;
- receiving, by a controller of the information processing device, input of a character through the virtual keyboard when (i) the touch panel detects a contact to a first button among the plurality of buttons, the first button associated with the character, (ii) the contact slides, on the virtual keyboard, to a second button among the plurality of buttons, and (iii) an angular difference between a direction of entering to the first button and a direction of leaving from the first button is larger than a threshold value;
- storing, by the controller, information of the received character; and
- when a predetermined gesture is performed, the predetermined gesture being a gesture in which a user of the information processing device places a finger on any one of four corner regions of the touch panel and moves the finger in a diagonal direction toward a corner region which is opposite to the corner region on which the finger is placed while keeping the finger in contact with the touch panel,
- turning up a part of a displayed first object in the diagonal direction in which the finger moves and
- to turn up a part of a displayed first object in the diagonal direction in which the finger moves, and to display a subsequent second object exposed in an area below the part being turned up, and
- the controller being configured to, when the finger moves to a predetermined point on the touch panel, display the virtual keyboard in the area below the first object and the subsequent second object, and
- when the finger moves into an area of the virtual keyboard from the predetermined point while continuing to maintain contact with the touch panel, the controller is configured to cause the first object to receive input of a character string through the virtual keyboard.

7. The character input method according to claim 6, wherein the turning up the part of the displayed first object is continued after displaying the virtual keyboard while the predetermined gesture is continued.

8. The character input method according to claim 6, further comprising when the predetermined gesture is continued and the subsequent second object is displayed full-screen on the touch panel, setting the subsequent second object as a target to be operated.

* * * * *